United States Patent
Geraldo et al.

(10) Patent No.: US 12,348,539 B2
(45) Date of Patent: Jul. 1, 2025

(54) SYSTEMS, METHODS, AND GRAPHICAL USER INTERFACES FOR CONFIGURING AND EXECUTING ONE OR MORE COMPUTER-EXECUTABLE THREAT HUNTING PROTOCOLS IN A CYBERSECURITY THREAT DETECTION AND MITIGATION PLATFORM

(71) Applicant: Expel, Inc., Herndon, VA (US)

(72) Inventors: Bryan Geraldo, Portland, OR (US); Nathan Sorrel, Littleton, CO (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/820,043

(22) Filed: Aug. 29, 2024

(65) Prior Publication Data

US 2025/0080553 A1  Mar. 6, 2025

Related U.S. Application Data

(60) Provisional application No. 63/546,886, filed on Nov. 1, 2023, provisional application No. 63/535,554, filed on Aug. 30, 2023.

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC ............ H04L 63/1416; H04L 63/1425; H04L 63/1433; H04L 63/1408; H04L 63/126; H04L 63/14

USPC ....................................................... 726/22-25
See application file for complete search history.

(56) References Cited

U.S. PATENT DOCUMENTS

| | | | |
|---|---|---|---|
| 9,148,441 B1* | 9/2015 | Tamersoy | G06F 21/566 |
| 9,430,646 B1* | 8/2016 | Mushtaq | H04L 67/02 |
| 9,912,695 B1* | 3/2018 | Chao | H04L 63/1425 |
| 10,019,338 B1* | 7/2018 | Goradia | G06F 21/54 |
| 10,326,796 B1* | 6/2019 | Varadarajan | H04L 63/1425 |
| 10,848,512 B2* | 11/2020 | Murphy | G06F 21/55 |
| 11,055,405 B1* | 7/2021 | Jin | G06F 21/552 |
| 11,336,669 B2* | 5/2022 | Bazalgette | H04L 63/1441 |

(Continued)

*Primary Examiner* — Kambiz Zand
*Assistant Examiner* — Mahabub S Ahmed
(74) *Attorney, Agent, or Firm* — Padowithz Alce; Alce PLLC

(57) ABSTRACT

A system, method, and computer-program product includes executing a computer-executable threat hunting protocol for autonomously assessing digital activity data associated with one or more environments of a subscriber, wherein executing the computer-executable threat hunting protocol includes: executing the at least one behavioral sequence model to output an initial set of likely suspicious digital activity that occurred within the one or more environments, assessing the initial set of likely suspicious digital activity outputted by the at least one behavioral sequence model against the at least one auxiliary enrichment dataset to identify a subset of the initial set of likely suspicious digital activity that is not suspicious, and outputting a refined set of suspicious digital activity by removing the subset of the initial set of likely suspicious digital activity from the initial set of likely suspicious digital activity, and surfacing, via a user interface, the refined set of suspicious digital activity.

19 Claims, 11 Drawing Sheets

(56) References Cited

U.S. PATENT DOCUMENTS

| | | | |
|---|---|---|---|
| 11,374,952 B1* | 6/2022 | Coskun | G06N 3/045 |
| 11,636,206 B2* | 4/2023 | Kenyon | G06F 21/554 |
| | | | 726/23 |
| 11,956,255 B1* | 4/2024 | Holub | G06N 20/00 |
| 12,132,746 B2* | 10/2024 | Thomas | G06F 21/53 |
| 2006/0129382 A1* | 6/2006 | Anand | G06F 21/552 |
| | | | 704/9 |
| 2012/0110174 A1* | 5/2012 | Wootton | H04L 63/1416 |
| | | | 709/224 |
| 2013/0305369 A1* | 11/2013 | Karta | H04L 63/1416 |
| | | | 726/23 |
| 2014/0201836 A1* | 7/2014 | Amsler | H04L 63/20 |
| | | | 726/23 |
| 2014/0280889 A1* | 9/2014 | Nispel | H04L 43/026 |
| | | | 709/224 |
| 2015/0039513 A1* | 2/2015 | Adjaoute | G06Q 30/0609 |
| | | | 705/44 |
| 2015/0047032 A1* | 2/2015 | Hannis | H04L 63/1491 |
| | | | 726/23 |
| 2015/0074806 A1* | 3/2015 | Roundy | H04L 63/1425 |
| | | | 726/23 |
| 2016/0014149 A1* | 1/2016 | Bradley | H04L 63/1408 |
| | | | 726/14 |
| 2016/0283715 A1* | 9/2016 | Duke | G06Q 20/4016 |
| 2017/0103674 A1* | 4/2017 | Sadeh-Koniecpol | G06F 21/566 |
| 2018/0124082 A1* | 5/2018 | Siadati | H04L 63/1425 |
| 2018/0255076 A1* | 9/2018 | Paine | H04L 63/1416 |
| 2018/0255079 A1* | 9/2018 | Paine | H04L 63/1433 |
| 2018/0288066 A1* | 10/2018 | Brockhuus | H04L 67/306 |
| 2019/0116192 A1* | 4/2019 | Singh | H04L 63/1441 |
| 2020/0213338 A1* | 7/2020 | Lotem | G06N 20/00 |
| 2020/0302058 A1* | 9/2020 | Kenyon | G06F 21/554 |
| 2020/0304528 A1* | 9/2020 | Ackerman | H04L 63/1425 |
| 2021/0073819 A1* | 3/2021 | Hernandez | G06Q 20/4016 |
| 2021/0160281 A1* | 5/2021 | Hallaji | H04L 63/1491 |
| 2021/0266294 A1* | 8/2021 | Chechik | H04L 63/105 |
| 2021/0271741 A1* | 9/2021 | Habal | G06F 21/577 |
| 2021/0377294 A1* | 12/2021 | Gupta | H04L 63/1425 |
| 2021/0390510 A1* | 12/2021 | Wuslich | H04L 63/1441 |
| 2022/0035929 A1* | 2/2022 | Hicks | G06F 11/3692 |
| 2022/0046047 A1* | 2/2022 | Lewis | G06F 21/554 |
| 2022/0070182 A1* | 3/2022 | Bowditch | H04L 63/1425 |
| 2022/0224724 A1* | 7/2022 | Bazalgette | G06F 21/554 |
| 2022/0385683 A1* | 12/2022 | Jones | H04L 63/1441 |
| 2023/0068293 A1* | 3/2023 | Nezhdanov | G06F 21/554 |
| 2023/0199006 A1* | 6/2023 | Gurnov | H04L 63/1425 |
| | | | 726/23 |
| 2023/0362187 A1* | 11/2023 | Walch | H04L 63/1433 |
| 2024/0129323 A1* | 4/2024 | Garyani | G06F 21/554 |
| 2024/0214419 A1* | 6/2024 | Neuhof | H04L 63/1483 |
| 2024/0289367 A1* | 8/2024 | Murphy | G06N 3/0475 |
| 2024/0291853 A1* | 8/2024 | Murphy | G06F 21/552 |

\* cited by examiner

200

> Formulating a Cybersecurity Threat Hunting Hypothesis S210

> Sourcing one or more Disparate Sets of Cybersecurity Event Data S220

> Encoding a Computer-Executable Threat Hunting Protocol S230

> Executing the Computer-Executable Threat Hunting Protocol S240

> Surfacing High-Fidelity Hunting Leads S250

FIGURE 2

SYSTEMS, METHODS, AND GRAPHICAL USER INTERFACES FOR CONFIGURING AND EXECUTING ONE OR MORE COMPUTER-EXECUTABLE THREAT HUNTING PROTOCOLS IN A CYBERSECURITY THREAT DETECTION AND MITIGATION PLATFORM

CROSS-REFERENCE TO RELATED APPLICATIONS

This application claims the benefit of U.S. Provisional Application No. 63/546,886, filed 1 Nov. 2023 and U.S. Provisional Application No. 63/535,554, filed 30 Aug. 2023, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. Furthermore, there is a need in the cybersecurity field to develop improved systems and methods that do not just scale intelligently to match the growing volume of security threats, but also proactively identify potential threats before they occur and/or to identify potential threats that may not have been detected or identified by traditional detection technology. The embodiments of the present application described herein provide technical solutions that address, at least the need described above.

BRIEF SUMMARY OF THE INVENTION(S)

In one embodiment, a computer-program product embodied in a non-transitory machine-readable storage medium storing computer instructions that, when executed by one or more processors, perform operations including: sourcing, from a computer database, a corpus of raw event data that includes digital activity that occurred within one or more environments of a target subscriber; identifying a set of attacker event types indicative of a target attack type based on assessing the corpus of raw event data of the target subscriber, wherein the set of attacker event types are used in a majority of real-world attacks of the target attack type; computing, for each attacker event type of the set of attacker event types, an event frequency count that numerically represents an occurrence of a subject attacker event type within historical raw event data of a plurality of subscribers; identifying one or more infrequent attacker event types of the set of attacker event types based on the event frequency count computed for each attacker event type of the set of attacker event types, wherein the event frequency count of each infrequent attacker event type of the one or more infrequent attacker event types is below a predetermined minimum event frequency threshold value; encoding a computer-executable threat hunting protocol configured to identify suspicious digital activity of the target attack type in the one or more environments of the target subscriber, wherein encoding the computer-executable threat hunting protocol includes: constructing an attacker behavioral sequence model based on the set of attacker event types and the one or more infrequent attacker event types; and surfacing, via a graphical user interface, suspicious sequences of digital activity that occurred in the one or more environments of the target subscriber in response to executing the computer-executable threat hunting protocol.

In one embodiment, constructing the attacker behavioral sequence model includes encoding the attacker behavioral sequence model to output the suspicious sequences of digital activity when one of a first predefined attacker-indicative condition and a second predefined attacker-indicative condition is met, the first predefined attacker-indicative condition is met when a subject sequence of digital activity that occurred or is occurring within the one or more environments of the target subscriber includes a predetermined number of attacker events that match or correspond to one or more attacker event types of the set of attacker event types within a predetermined timeframe, and the second predefined attacker-indicative condition is met when the subject sequence of digital activity that occurred or is occurring within the one or more environments of the target subscriber includes (i) a predefined number of attacker events that match or correspond to one or more attacker event types of the set of attacker event types and (ii) one infrequent attacker event that matches or corresponds to one of the one or more infrequent attacker event types within the predetermined timeframe.

In one embodiment, constructing the attacker behavioral sequence model includes encoding the attacker behavioral sequence model to output the suspicious sequences of digital activity when one of a first predefined attacker-indicative condition and a second predefined attacker-indicative condition is met, the first predefined attacker-indicative condition is met when a subject sequence of digital activity that occurred or is occurring within the one or more environments of the target subscriber includes a predetermined number of events that match or correspond to one or more attacker event types of the set of attacker event types within a predetermined timeframe, and the second predefined attacker-indicative condition is met when the subject sequence of digital activity that occurred or is occurring within the one or more environments of the target subscriber includes (i) a predefined number of events that match or correspond to one or more attacker event types of the set of attacker event types and (ii) one infrequent attacker event that matches or corresponds to one of the one or more infrequent attacker event types within the predetermined timeframe.

In one embodiment, constructing the attacker behavioral sequence model includes encoding the attacker behavioral sequence model to output the suspicious sequences of digital activity when one of a first predefined attacker-indicative condition and a second predefined attacker-indicative condition is met, the first predefined attacker-indicative condition is satisfied when the attacker behavioral sequence model detects that a subject sequence of digital activity has at least five attacker events of a type that match or correspond to one or more attacker event types of the set of attacker event types within a predetermined timeframe, and the second predefined attacker-indicative condition is satisfied when the attacker behavioral sequence model detects that a given sequence of digital activity has (i) three attacker events of a type that match or correspond to the one or more attacker event types of the set of attacker event types within the predetermined timeframe and (ii) one infrequent attacker event that matches or corresponds to one of the one or more infrequent attacker event types within the predetermined timeframe.

In one embodiment, constructing the attacker behavioral sequence model includes encoding the attacker behavioral sequence model to output the suspicious sequences of digital activity when one of a first predefined attacker-indicative condition and a second predefined attacker-indicative condition is met, the first predefined attacker-indicative condition is satisfied when the attacker behavioral sequence model detects that a subject sequence of digital activity has at least five events of a type that match or correspond to one or more attacker event types of the set of attacker event types within a predetermined timeframe, and the second predefined attacker-indicative condition is satisfied when the attacker behavioral sequence model detects that a given sequence of digital activity has (i) three events of a type that match or correspond to the one or more attacker event types of the set of attacker event types within the predetermined timeframe and (ii) one event that matches or corresponds to one of the one or more infrequent attacker event types within the predetermined timeframe.

In one embodiment, constructing the attacker behavioral sequence model includes encoding the attacker behavioral sequence model to output the suspicious sequences of digital activity when any one of a plurality of predefined attacker-indicative conditions is satisfied, and the plurality of predefined attacker-indicative conditions are configured to value the one or more infrequent attacker event types with greater significance than any attacker event type of the set of attacker event types that are not classified or identified as infrequent attacker event types.

In one embodiment, executing the computer-executable threat hunting protocol includes executing, via the one or more processors, the attacker behavioral sequence model, executing the attacker behavioral sequence model includes assessing a target corpus of raw event data of a target timespan of the target subscriber to identify a plurality of suspicious sequences of digital activity that satisfy predefined attacker-indicative conditions of the attacker behavioral sequence model, and the suspicious sequences of digital activity includes the plurality of suspicious sequences of digital activity identified by the attacker behavioral sequence model.

In one embodiment, encoding the computer-executable threat hunting protocol further includes digitally pairing the attacker behavioral sequence model with one or more auxiliary enrichment datasets, the attacker behavioral sequence model outputs a first set of suspicious sequences of digital activity that satisfies predetermined criteria of the attacker behavioral sequence model in response to executing the computer-executable threat hunting protocol, the computer-executable threat hunting protocol uses the one or more auxiliary enrichment datasets digitally paired with the attacker behavioral sequence model to pare down the first set of suspicious sequences of digital activity to a refined set of suspicious sequences of digital activity, and surfacing the suspicious sequences of digital activity includes only surfacing the refined set of suspicious sequences of digital activity.

In one embodiment, the one or more auxiliary enrichment datasets includes: a first distinct auxiliary enrichment dataset, a second distinct auxiliary enrichment dataset, and a third distinct auxiliary enrichment dataset, and the first distinct auxiliary enrichment dataset, the second distinct auxiliary enrichment dataset, and the third distinct auxiliary enrichment dataset are different datasets.

In one embodiment, encoding the computer-executable threat hunting protocol further includes digitally pairing the attacker behavioral sequence model with an auxiliary enrichment dataset, the attacker behavioral sequence model outputs a first set of suspicious sequences of digital activity that satisfies predetermined criteria of the attacker behavioral sequence model in response to executing the computer-executable threat hunting protocol, and the computer-executable threat hunting protocol uses the auxiliary enrichment dataset to adapt the first set of suspicious sequences of digital activity to a refined set of suspicious sequences of digital activity by automatically assessing each suspicious sequence of digital activity of the first set of suspicious sequences of digital activity against security data within one or more columns of the auxiliary enrichment dataset.

In one embodiment, encoding the computer-executable threat hunting protocol further includes digitally pairing the attacker behavioral sequence model with an auxiliary enrichment dataset, the attacker behavioral sequence model outputs a first set of suspicious sequences of digital activity that satisfies predetermined criteria of the attacker behavioral sequence model in response to executing the computer-executable threat hunting protocol, and the computer-executable threat hunting protocol uses the auxiliary enrichment dataset to filter out and remove a subset of suspicious sequences of digital activity of the first set of suspicious sequences of digital activity that do not meet a count-based threshold criterion based on a count-based feature included in the auxiliary enrichment dataset.

In one embodiment, encoding the computer-executable threat hunting protocol further includes digitally pairing the attacker behavioral sequence model with an auxiliary enrichment dataset, the attacker behavioral sequence model outputs a first set of suspicious sequences of digital activity that satisfies predetermined criteria of the attacker behavioral sequence model in response to executing the computer-executable threat hunting protocol, and the computer-executable threat hunting protocol performs a dataset intersection operation between the first set of suspicious sequences of digital activity and the auxiliary enrichment dataset to remove suspicious sequences of digital activity from the first set of suspicious sequences of digital activity that do not intersect with the auxiliary enrichment dataset.

In one embodiment, the computer-program product further includes initiating one or more threat mitigation responses that resolve at least one security threat involving the one or more environments of the subscriber based on the refined set of suspicious digital activity.

In one embodiment, the computer-program product further includes mitigating, via the one or more processors, one or more cybersecurity threats associated with at least a subset of the suspicious sequences of digital activity based on surfacing the suspicious sequences of digital activity that occurred in the one or more environments of the target subscriber.

In one embodiment, a computer-program product embodied in a non-transitory machine-readable storage medium storing computer instructions that, when executed by one or more processors, perform operations including: at a cybersecurity event detection and response service: receiving, via the one or more processors, a request to execute a computer-executable threat hunting protocol that includes at least one behavioral sequence model and at least one auxiliary enrichment dataset; executing, via the one or more processors, the computer-executable threat hunting protocol to assess digital activity data associated with one or more environments of a subscriber to the cybersecurity event detection and response service, wherein executing the computer-executable threat hunting protocol includes: executing the at least one behavioral sequence model to output an initial set of likely suspicious digital activity that occurred within the one or more environments of the subscriber that satisfies one or more predetermined attacker-indicative conditions of the at least one behavioral sequence model, assessing the initial set of likely suspicious digital activity outputted by the at least one behavioral sequence model against the at least one auxiliary enrichment dataset to identify a subset of the initial set of likely suspicious digital activity that is not suspicious, and outputting a refined set of suspicious digital activity by removing the subset of the initial set of likely suspicious digital activity from the initial set of likely suspicious digital activity; and surfacing, via a graphical user interface, the refined set of suspicious digital activity in response to executing the computer-executable threat hunting protocol.

In one embodiment, the computer-program product further includes executing, via the one or more processors, one or more cybersecurity handling actions that resolves or mitigates a cybersecurity threat associated with the refined set of suspicious digital activity.

In one embodiment, the computer-program product further includes identifying a set of attacker commands indicative of a target attack type based on assessing a corpus of historical raw event data of the subscriber, wherein the set of attacker commands are used in a majority of real-world attacks of the target attack type; computing, for each attacker command of the set of attacker commands, an attacker command frequency count that numerically represents an occurrence of a subject attacker command within historical raw event data of a plurality of subscribers; identifying one or more infrequent attacker commands of the set of attacker commands based on the attacker command frequency count computed for each attacker command of the set of attacker commands, wherein the attacker command frequency count of each infrequent attacker command of the one or more infrequent attacker commands is below a predetermined minimum attacker command frequency threshold value; and encoding the behavioral sequence model based on the set of attacker commands and the one or more infrequent attacker commands.

In one embodiment, encoding the behavioral sequence model based on the set of attacker commands and the one or more infrequent attacker commands includes encoding the behavioral sequence model to output the initial set of likely suspicious digital activity when at least one of the one or more predetermined attacker-indicative conditions is met, a first predetermined attacker-indicative condition of the one or more predetermined attacker-indicative conditions is met when a subject sequence of digital activity that occurred within the one or more environments of the subscriber includes a predetermined number of attacker commands that match or correspond to one or more attacker commands of the set of attacker commands within a predetermined timeframe, and a second predetermined attacker-indicative condition of the one or more predetermined attacker-indicative conditions is met when a given sequence of digital activity that occurred within the one or more environments of the subscriber includes (i) a predefined number of attacker commands that match or correspond to one or more attacker commands of the set of attacker commands within the predetermined timeframe and (ii) one infrequent attacker command that matches or corresponds to the one or more infrequent attacker commands within the predetermined timeframe.

In one embodiment, encoding the behavioral sequence model based on the set of attacker commands and the one or more infrequent attacker commands includes encoding the behavioral sequence model to output the initial set of likely suspicious digital activity when at least one of the one or more predetermined attacker-indicative conditions is met, a first predetermined attacker-indicative condition of the one or more predetermined attacker-indicative conditions is met when a subject sequence of digital activity that occurred within the one or more environments of the subscriber includes a predetermined number of commands that match or correspond to one or more attacker commands of the set of attacker commands within a predetermined timeframe, and a second predetermined attacker-indicative condition of the one or more predetermined attacker-indicative conditions is met when a given sequence of digital activity that occurred within the one or more environments of the subscriber includes (i) a predefined number of commands that match or correspond to one or more attacker commands of the set of attacker commands within the predetermined timeframe and (ii) one command that matches or corresponds to the one or more infrequent attacker commands within the predetermined timeframe.

In one embodiment, the at least one behavioral sequence model includes: a first behavioral sequence model that is configured to detect suspicious digital activity that corresponds to a first distinct attack type, and a second behavioral sequence model that is configured to detect suspicious digital activity that corresponds to a second distinct attack type.

In one embodiment, the at least one auxiliary enrichment dataset includes: a first distinct auxiliary enrichment dataset that provides contextual data related to error events, a second distinct auxiliary enrichment dataset that provides contextual data related to infrequently used autonomous system numbers (ASN) and internet protocol (IP) addresses across all subscribers to the cybersecurity event detection and response service, wherein each infrequently used autonomous system number and each infrequently used internet protocol address is below a low-usage count threshold, and a third distinct auxiliary enrichment dataset that provides contextual data related to the internet protocol (IP) addresses involved in cybersecurity incidents.

In one embodiment, the at least one behavioral sequence model includes a set of computer-executable instructions that, when executed, executes an automated sequence of tasks that: automatically queries one or more corpora of historical event data of the subscriber of a predetermined time span based on the predetermined attacker-indicative conditions of the at least one behavioral sequence model, and automatically returns the initial set of likely suspicious digital activity that occurred within the one or more environments of the subscriber in response to querying the one or more corpora of historical event data.

In one embodiment, the refined set of suspicious digital activity includes one or more compromised digital assets or one or more compromised computing assets of the subscriber, the computer-program product further comprises computer instructions for performing operations including: collecting one or more additional pieces of context data related to each of the one or more compromised digital assets or the one or more compromised computing assets of the subscriber when the refined set of suspicious digital activity includes the one or more compromised digital assets or the one or more compromised computing assets of the subscriber.

In one embodiment, the refined set of suspicious digital activity includes one or more compromised digital assets or one or more compromised computing assets of the subscriber, the computer-program product further comprises computer instructions for performing operations including: generating, via the one or more processors, one or more security alerts based on the one or more compromised digital assets or the one or more compromised computing assets of the subscriber, and routing, via the one or more processors, each of the one or more security alerts to a security alert queue in response to generating the one or more security alerts.

In one embodiment, the computer-program further includes automatically disabling, via the one or more processors, one or more compromised user accounts identified within the refined set of suspicious digital activity by automatically configuring and executing one or more application programming interface requests.

In one embodiment, the computer-program further includes automatically disabling or modifying, via the one or more processors, one or more compromised cloud access keys of the subscriber identified within the refined set of suspicious digital activity by automatically configuring and executing one or more application programming interface requests.

In one embodiment, the computer-program further includes automatically disabling, via the one or more processors, one or more compromised network hosts of the subscriber identified within the refined set of suspicious digital activity by automatically configuring and executing one or more application programming interface requests.

In one embodiment, constructing the attacker behavioral sequence model includes encoding the attacker behavioral sequence model to output the suspicious sequences of digital activity when one of a first predefined attacker-indicative condition and a second predefined attacker-indicative condition is met, the first predefined attacker-indicative condition is met when a subject sequence of digital activity that occurred or is occurring within the one or more environments of the target subscriber includes a predetermined number of events that match or correspond to one or more attacker event types of the set of attacker event types within a predetermined timeframe, and the second predefined attacker-indicative condition is met when the subject sequence of digital activity that occurred or is occurring within the one or more environments of the target subscriber includes (i) a predefined number of events that match or correspond to one or more attacker event types of the set of attacker event types and (ii) one infrequent attacker event that matches or corresponds to one of the one or more infrequent attacker event types within the predetermined timeframe.

In one embodiment, constructing the attacker behavioral sequence model includes encoding the attacker behavioral sequence model to output the suspicious sequences of digital activity when one of a first predefined attacker-indicative condition and a second predefined attacker-indicative condition is met, the first predefined attacker-indicative condition is satisfied when the attacker behavioral sequence model detects that a subject sequence of digital activity has at least five events of a type that match or correspond to one or more attacker event types of the set of attacker event types within a predetermined timeframe, and the second predefined attacker-indicative condition is satisfied when the attacker behavioral sequence model detects that a given sequence of digital activity has (i) three events of a type that match or correspond to the one or more attacker event types of the set of attacker event types within the predetermined timeframe and (ii) one infrequent attacker event that matches or corresponds to one of the one or more infrequent attacker event types within the predetermined timeframe.

In one embodiment, a computer-implemented method for adaptive cybersecurity threat hunting includes sourcing, from a computer database, a corpus of raw event data that includes digital activity that occurred within one or more environments of a target subscriber; identifying a set of attacker events indicative of a target attack type based on assessing the corpus of raw event data of the target subscriber, wherein the set of attacker events are used in a majority of real-world attacks of the target attack type; computing, for each attacker event of the set of attacker events, an event frequency count that numerically represents an occurrence of a subject attacker event within historical raw event data of a plurality of subscribers; identifying one or more infrequent attacker events of the set of attacker events based on the event frequency count computed for each attacker event of the set of attacker events, wherein the event frequency count of each infrequent attacker event of the one or more infrequent attacker events is below a predetermined minimum event frequency threshold value; encoding a computer-executable threat hunting protocol configured to identify suspicious digital activity of the target attack type in the one or more environments of the target subscriber, wherein encoding the computer-executable threat hunting protocol includes: constructing an attacker behavioral sequence model based on the set of attacker events and the one or more infrequent attacker events; and surfacing, via a graphical user interface, suspicious sequences of digital activity that occurred in the one or more environments of the target subscriber in response to executing the computer-executable threat hunting protocol.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
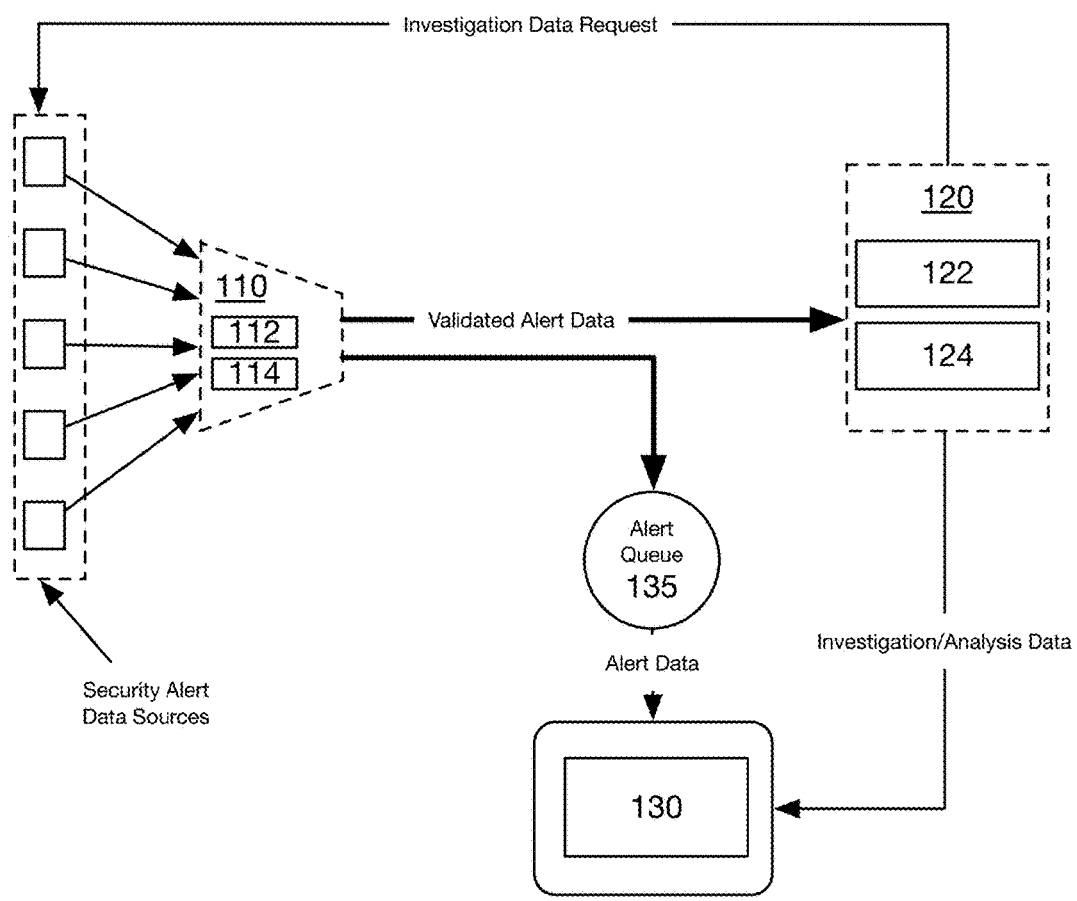
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts, a subset of inbound events, a subset of raw logs, and/or the like as security threats requiring an escalation, an investigation, and/or a threat mitigation response by the system 100 and/or by a subscriber to the system 100. It shall be recognized that, in some embodiments, the security alert data may include raw logs.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber. Additionally, in one or more embodiments, the system user may function to make one or more requests for performing cross-correlation of data between disparate data sets (i.e., disparate sets of cybersecurity event data, raw logs, and/or any other suitable type of data).

Additionally, or alternatively, in one or more embodiments, the security mitigation user interface 130 may include and/or may be in digital communication with a security alert queue 135 that stores and prioritizes validated security alerts.

Additionally, or alternatively, in one or more embodiments, the security threat mitigation user interface may enable an analyst, an administrator, and/or the like an ability to perform retrospective analysis (i.e., lookbacks) of historical data or logs to identify and/or surface potential threats that may have been missed or overlooked using one or more portions of the system(s) and/or method(s) described herein. Furthermore, in some embodiments, the security threat mitigation user interface may enable the analyst, the administrator, and/or the like to identify threats in real-time or near real-time using one or more portions of the system(s) and/or method(s) described herein.

1.4 Hunt Detection Configuration Module

Additionally, or alternatively, in some embodiments, the system 100 or a subsystem of the system 100 may include a hunt detection configuration module. The hunt detection configuration module, in some embodiments, may be designed to accelerate a creation of a hunt-type detection. In other words, the hunt detection configuration module may enhance the system 100 or the subsystem of the system 100 as it is configured to quickly create and deploy hunt-type detections by (at least) rapidly obtaining and joining data from a plurality of distinct sources of event data, as described in more detail herein.

2. Method for Configuring and Executing One or More Computer-Executable Threat Hunting Protocols As shown in FIG. 2, a method 200 for configuring and executing one or more computer-executable threat hunting protocols includes formulating a cybersecurity threat hunting hypothesis (S210), sourcing one or more disparate sets of cybersecurity event data (S220), encoding a computer-executable threat hunting protocol (S230), executing the computer-executable threat hunting protocol (S240), and surfacing high-fidelity hunting leads (S250).

The systems, methods, and computer program products described herein may be utilized in a variety of cybersecurity environments where proactive threat detection and proactive threat hunting is critical. This includes cybersecurity environments where identifying and mitigating suspicious activity is essential for maintaining the integrity and security of digital assets. Furthermore, such systems, methods, and computer program products may identify suspicious activity occurring in one or more environments of a target subscriber that may have otherwise gone undetected by conventional security measures or tools.

The systems, methods, and computer program products, in one or more embodiments, may use one or more weak signals (e.g., one or more auxiliary enrichment datasets) and one or more behavioral sequence models to surface potential threats and/or suspicious digital activity that occurred and/or is occurring in one or more environments of a target subscriber. For example, by encoding a behavioral sequence model with a specific group of events and/or commands that are indicative of malicious activity and pairing the behavioral sequence model with one or more weak signals (e.g., one or more auxiliary enrichment datasets), the systems, methods, and computer program products may accelerate a detection of suspicious digital activity, complex threat patterns, and/or subtle threat patterns that would traditionally go undetected.

In other words, the behavioral sequence model paired with the one or more auxiliary enrichment datasets may enable the systems, methods, and computer program products to detect complex and nuanced threat scenarios. For instance, a series of seemingly innocuous events or commands executed by a user (e.g., user logins, specific API calls, file access commands, etc.), when viewed in isolation, may appear benign. However, when these events of the user are grouped together, occur within a predetermined time span, and/or analyzed alongside one or more auxiliary enrichment datasets (e.g., error messages, rare ASN, internet protocol addresses associated with security incidents, etc.), the systems, methods, and computer program products may identify digital activity or sequences of digital activity (e.g., the series of seemingly innocuous events or commands executed by the user) that are malicious or suspicious.

2.10 Formulating a Cybersecurity Threat Hunting Hypothesis

S210, which includes formulating a cybersecurity threat hunting hypothesis, may function to formulate a cybersecurity threat hunting hypothesis for investigating one or more computing environments or the like of a target subscriber. A cybersecurity threat hunting hypothesis, in one or more embodiments, may be used to govern a direction or focus of a subject cybersecurity threat hunt. It shall be noted that a "cybersecurity threat hunting hypothesis" may be interchangeably referred to herein as a "hunt hypothesis", an "investigation hypothesis", a "hypothesis", and/or the like.

In one or more embodiments, S210 may function to formulate (i.e., construct, generate, and/or the like) a cybersecurity threat hunting hypothesis for a target subscriber based on an assessment of one or more digital infrastructure components (e.g., computing assets, digital assets, etc.) of the target subscriber, historical security data associated with the target subscriber, historical threat patterns, emerging threat patterns, and/or any suitable combination thereof. In other words, the cybersecurity threat hunting hypothesis may include a prediction of suspected suspicious activity and/or suspected security vulnerabilities occurring within the one or more digital infrastructure components of the target subscriber. Stated another way, the cybersecurity threat hunting hypothesis may serve as a foundational element of a subject cybersecurity threat hunt.

In one or more embodiments, the system or service 100 implementing the method 200 may be used to facilitate a creation of a cybersecurity threat hunting hypothesis through a plurality of distinct modes including, but not limited to, manual formulation by a security analyst, semi-automatic generation with analyst input, and/or a fully automatic hypothesis generation process. For instance, in a non-limiting example, a cybersecurity threat hunting hypothesis may be formulated by a security analyst using one or more portions of the system or service 100 implementing the method 200. Additionally, or alternatively, in such a non-limiting example, a cybersecurity threat hunting hypothesis may be semi-automatically generated by the system or service 100 implementing the method 200. Additionally, or alternatively, in such a non-limiting example, a cybersecurity threat hunting hypothesis may be automatically generated by the system or service 100 implementing the method 200.

It shall be recognized that, in one or more embodiments, a cybersecurity threat hunting hypothesis obtained and/or formulated by S210 may include a probable rationale or methodology for identifying malicious user(s) or attacker(s) within one or more computing environments of a target subscriber.

Example Cybersecurity Threat Hunting Hypotheses

In a non-limiting example, a cybersecurity threat hunting hypothesis obtained and/or formulated by S210 may be "Attackers live off the land and use tools, such as SharePoint, to exfiltrate data. Can we review download activity and identify users downloading a high volume of files or interesting files within a small-time frame? Activity meeting these criteria may be indicative of an attacker performing data exfiltration."

Additionally, or alternatively, in another non-limiting example, a cybersecurity threat hunting hypothesis obtained and/or formulated by S210 may be "Attackers exploiting Amazon Web Services (AWS) often follow a common sequence of behaviors, such as using specific Application Programming Interface (API) calls to gain an overview of a subject cloud service. Can we analyze AWS CloudTrail logs and identify users initiating these specific API calls in a particular sequence or within a short time frame? Activity meeting these criteria may be indicative of an attacker trying to conduct discovery and/or privilege escalation."

Additionally, or alternatively, in another non-limiting example, a cybersecurity threat hunting hypothesis obtained and/or formulated by S210 may be "Attackers may bypass Multi-Factor Authentication (MFA) and conditional access controls to gain unauthorized access to administrative applications such as Microsoft Azure CLI. Can we analyze authentication logs and identify users who are logging into these administrative apps without MFA or bypassing conditional access? Furthermore, can we track the subsequent actions of these users' post-login to identify any unusual or potentially malicious activities? Activity meeting these criteria may be indicative of an attacker attempting unauthorized access and potentially exploiting administrative tools."

It shall be recognized that S210 may function to formulate and/or generate additional cybersecurity threat hunting hypotheses, fewer cybersecurity threat hunting hypotheses, and/or different cybersecurity threat hunting hypotheses without departing from the scope of the disclosure.

2.20 Sourcing Disparate Sets of Cybersecurity Event Data

Figure 3:
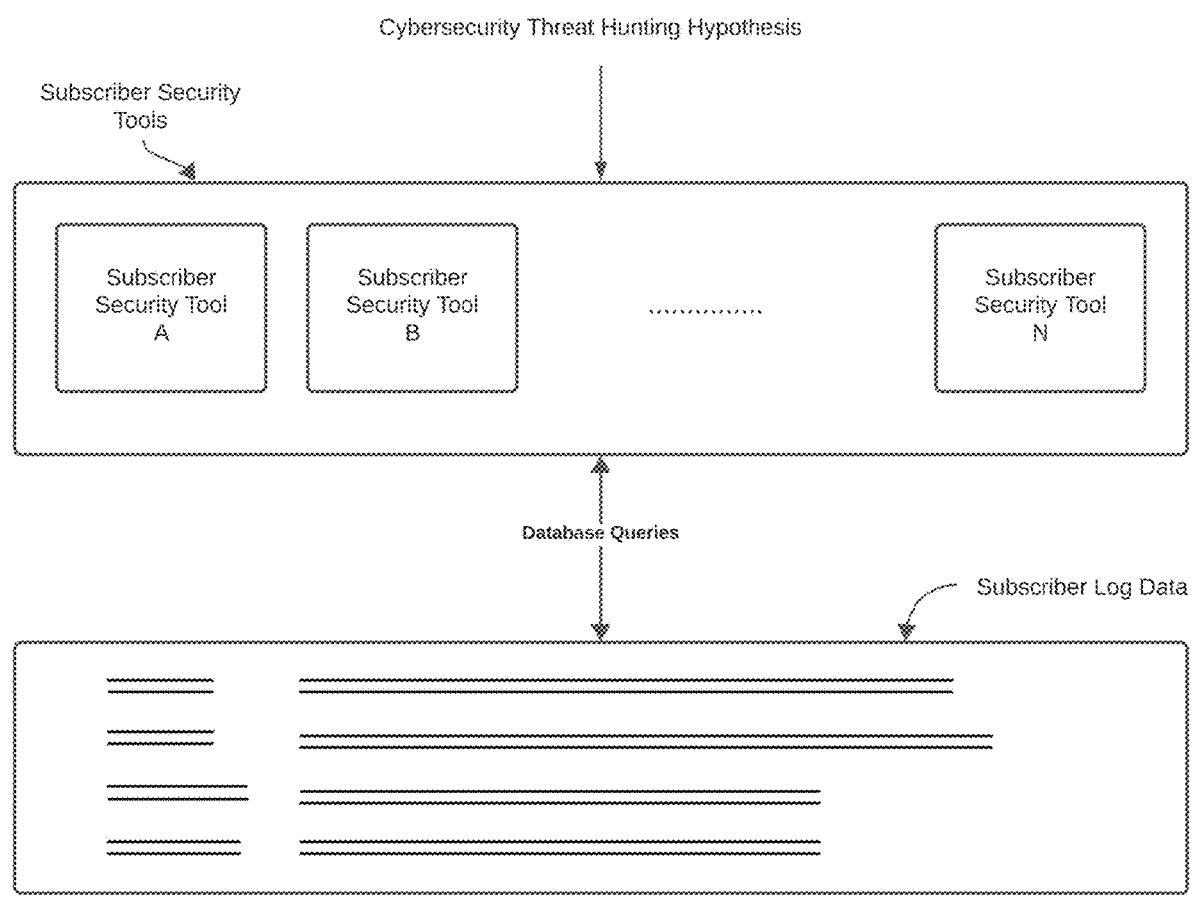
FIG. 3 illustrates an example schematic of obtaining a corpus of cybersecurity event data or log data associated with a target subscriber in accordance with one or more embodiments of the present application.

S220, which includes sourcing cybersecurity event data, may function to collect (or obtain) one or more distinct sets of cybersecurity event data based on a target cybersecurity threat hunting hypothesis, as shown generally by way of example in FIG. 3. In one or more embodiments, S220 may include generating and executing one or more database queries, obtaining one or more distinct sets of cybersecurity event data (i.e., log data) based on the one or more database queries, and/or joining the one or more distinct sets of cybersecurity event data based on the obtaining of the one or more distinct sets of cybersecurity event data. It shall be recognized that, in some embodiments, S220 may include additional, fewer, or different steps without departing from the scope of the disclosure.

Query Generation and Data Sourcing

In one or more embodiments, S220 may include generating and executing one or more database queries based on a target cybersecurity threat hunting hypothesis (i.e., the cybersecurity threat hunting hypothesis formulated in S210). In such embodiments, each of the one or more database queries may be configured to retrieve specific types of data (i.e., log data, raw event data, etc.) that may be relevant or germane to a target cybersecurity threat hunting hypothesis.

In one or more embodiments, S220 may function to generate one or more non-relational database queries that, when executed, queries a target technology data source (i.e., a Security Information and Event Management (SIEM) tool, a target endpoint security tool, and/or any other suitable security device or repository storing log data) to obtain raw event data of a subject subscriber that corresponds to a subject cybersecurity threat hunting hypothesis. The raw event data, in one or more embodiments, may include log data, network traffic data, user behavioral data, system configuration data, application usage data, file access record data, and/or any other suitable type of data. That is, in such embodiments, the raw event data (obtained by executing the one or more database queries) may include a corpus of data representative of digital activity occurring within the subject subscriber's digital infrastructure that is germane to the subject cybersecurity threat hunting hypothesis.

Stated another way, in one or more embodiments, based on or in response to identifying a cybersecurity threat hunting hypothesis defined in S210, S220 may function to generate and/or execute a plurality of database queries that is configured to obtain raw event data (i.e., log data). In such embodiments, each database query, when executed, may function to query a target SIEM or a target endpoint security tool and return a distinct set of raw event data (i.e., log data) that satisfies the subject database query.

For instance, in a non-limiting example, if the cybersecurity threat hunting hypothesis is based on detecting potential data exfiltration via SharePoint, one or more database queries may be configured to collect raw event data related to file download activities within SharePoint. The raw event data, in such a non-limiting example, may include the volume of files downloaded, the types of files downloaded, the time frame of the file downloads, the users initiating the downloads, and/or any other suitable data.

In another non-limiting example, if the cybersecurity threat hunting hypothesis is based on identifying potential unauthorized access to administrative applications such as Microsoft Azure CLI, one or more database queries may be configured to retrieve authentication log data. The authentication log data, in one or more embodiments, may include users logging into Microsoft Azure CLI, whether Multi-Factor Authentication (MFA) was used, whether conditional access controls were bypassed, subsequent actions of the users' post-login, and/or any other suitable type of data.

Data Joining

Accordingly, in some embodiments, based on (or in response to) executing a plurality of distinct database queries that returns a plurality of distinct datasets of event data (i.e., log data, etc.), S220 may function to join (e.g., fuse, amalgamate, etc.) the plurality of distinct datasets together using any suitable dataset joining technique to create a unified hunt-specific event data repository.

In one or more embodiments, S220 may function to source, from a computer database, one or more corpora of raw event data (e.g., one corpus of raw event data, a plurality of corpora of raw event data, etc.) that includes digital activity that occurred within one or more environments of a target subscriber. The sourced raw event data may include, but should not be limited to, user login data, API call data, file access data, network communication data, system commands performed within the one or more environments of the target subscriber, script executions performed within the one or more environments of the target subscriber, shell commands performed within the one or more environments of the target subscriber, or any other suitable type of digital activity.

It shall be noted that, in one or more embodiments, the one or more corpora of raw event data be associated with digital activity that occurred within the one or more environments of a target subscriber in the recent past (e.g., within the last year, last six months, last quarter, or shorter periods such as months or weeks).

2.30 Encoding a Computer-Executable Threat Hunting Protocol

S230, which includes encoding a computer-executable threat hunting protocol, may function to construct or encode a computer-executable threat hunting protocol based on at least the raw cybersecurity event data obtained by S220. A computer-executable threat hunting protocol, as generally referred to herein, may include a set of instructions that a computer system or platform may execute to perform threat hunting tasks. It shall be recognized that "encoding a computer-executable threat hunting protocol" may also be interchangeably referred to herein as "constructing a cybersecurity threat hunt" or the like.

Figure 8:
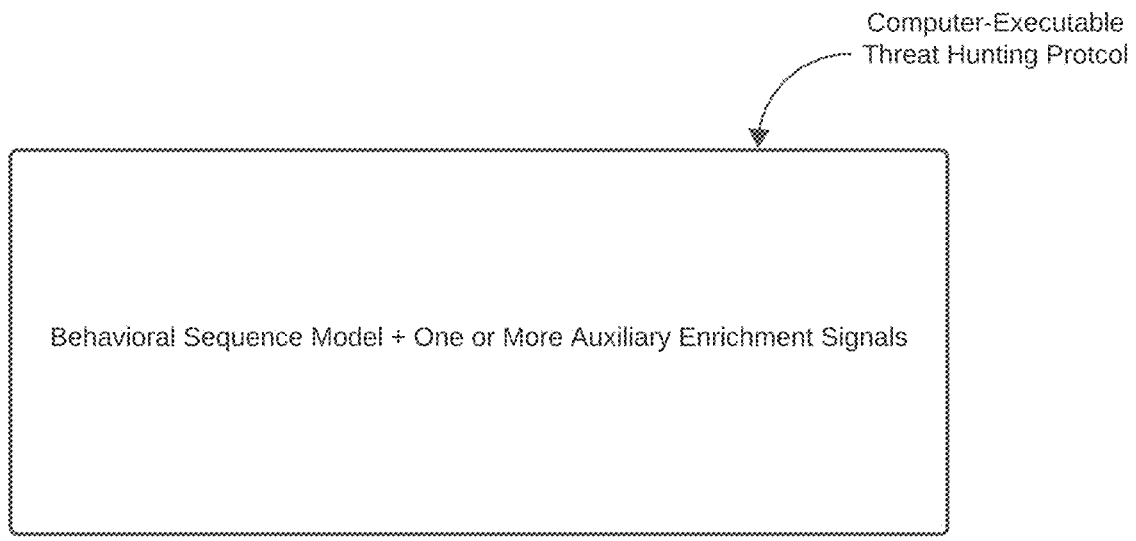
FIG. 8 illustrates an example of a computer-executable threat hunting protocol in accordance with one or more embodiments of the present application.
Figure 9:
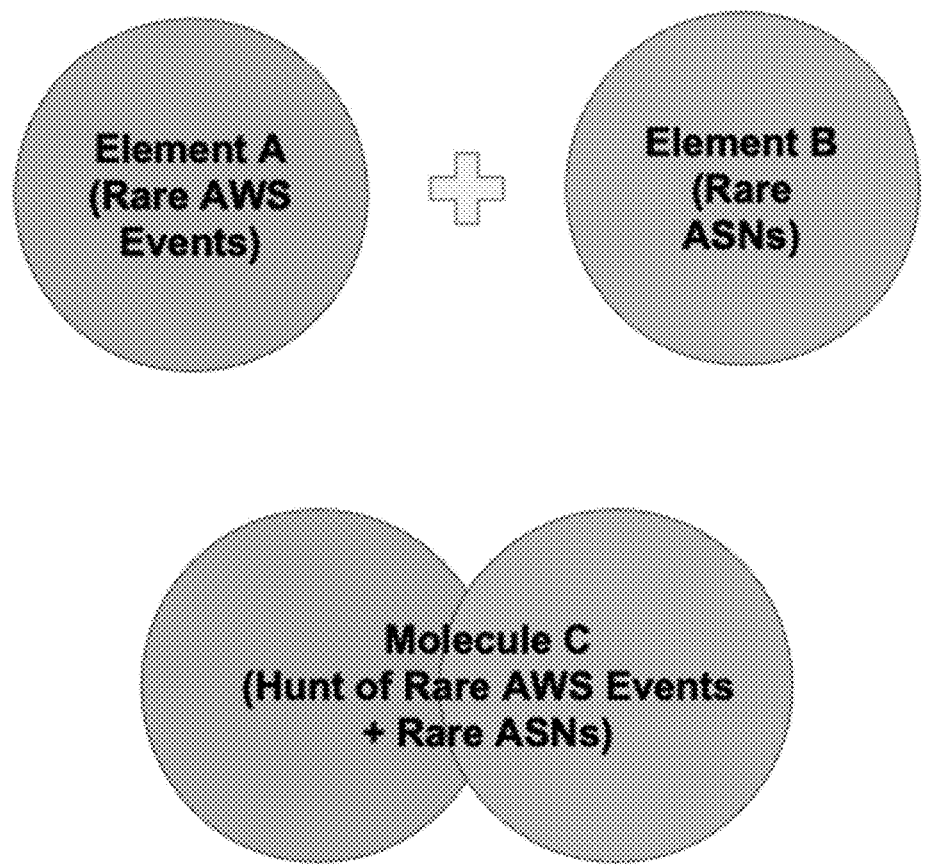
FIG. 9 illustrates an example schematic of a computer-executable threat hunting protocol in accordance with one or more embodiments of the present application.

In one or more embodiments, encoding a computer-executable threat hunting protocol may include a construction of a behavioral sequence model and pairing the behavioral sequence model with one or more auxiliary enrichment signals (i.e., weak signals, contextual datasets, etc.), as shown generally by way of example in FIG. 8 and FIG. 9.

It shall be recognized, in one or more embodiments, a system or service implementing method 200 may function to automatically encode or construct, via one or more processors, a subject computer-executable threat hunting protocol and/or the behavioral sequence model. It shall be further recognized, in one or more embodiments, the system or service implementing method 200 may function to automatically encode or construct, via one or more processors, the subject computer-executable threat hunting protocol and/or the behavioral sequence model based on receiving a sequence of inputs from a target user or the like.

Constructing a Behavioral Sequence Model

Figure 6:
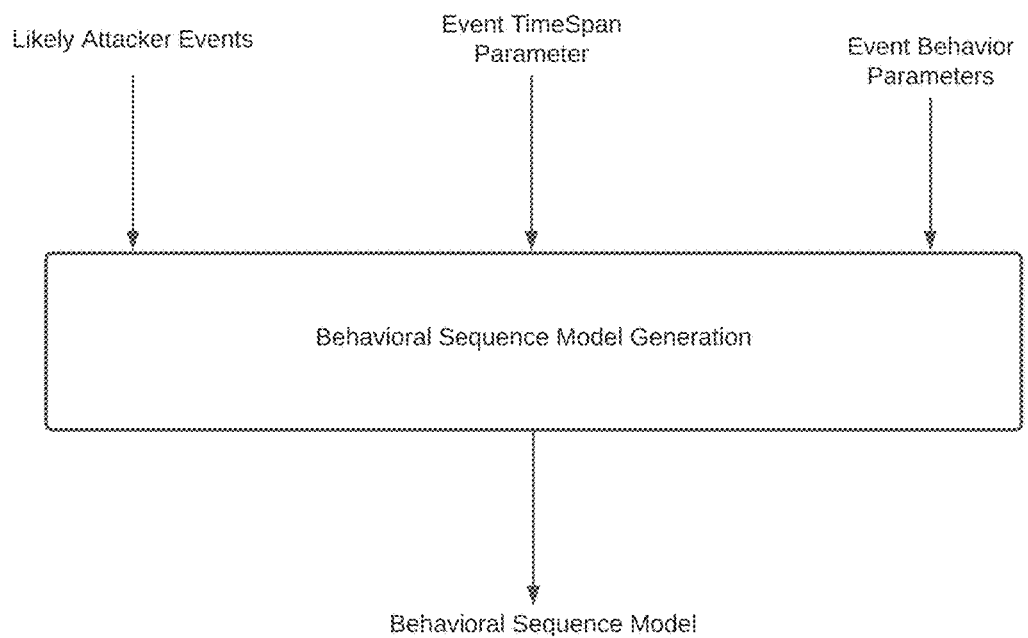
FIG. 6 illustrates an example of constructing or encoding a behavioral sequence model in accordance with one or more embodiments of the present application.

As described in more detail herein, a behavioral sequence model, when constructed, may function to identify anomalous or abnormal activity occurring within one or more systems or environments of a target subscriber by encoding a likely attacker behavioral pattern into the behavioral sequence model with one or more time constraint parameters. The encoding process, in one or more embodiments, may include encoding the behavioral sequence model with a typical set of events and/or behaviors that likely imitates a target type of attack, as shown generally by way of example in FIG. 6. This enables the behavior sequence model to effectively recognize and/or identify activity that is substantially similar to the typical set of events and/or behaviors commonly observed for the target type of attack.

It shall be recognized, in one or more embodiments, the typical set of events and/or behaviors encoded into the behavioral sequence model that imitates the target type of attack may include, but should not be limited to, commands commonly or typically executed by attackers for the target type of attack (e.g., API calls, system commands, attacker patterns, etc.).

(i) Identifying a Sequence of Events Indicative of a Likely Attack

Figure 4:
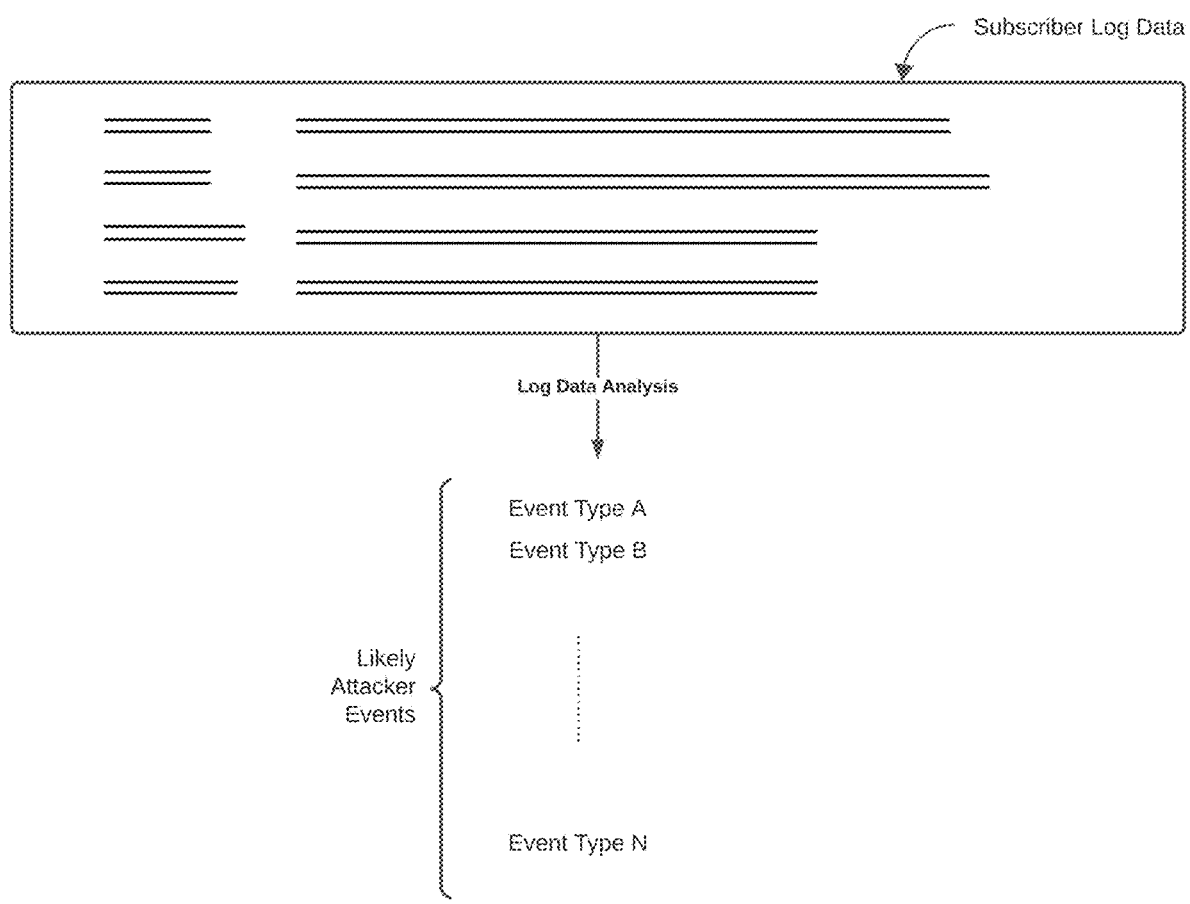
FIG. 4 illustrates an example schematic of identifying a set of likely attacker events in accordance with one or more embodiments of the present application.

In one or more embodiments, based on obtaining a corpus of event data (e.g., a corpus of log data and/or the like) from a target technology device as described in S220, S230 may function to assess the corpus of event data and, in turn, identify a probable sequence or set of attacker events that likely represents a potential attacker behavior based on the assessing of the corpus of event data (e.g., the corpus of log data, the corpus of raw event data, etc.), as shown generally by way of example in FIG. 4. The probable sequence or set of events (or behaviors), in one or more embodiments, may serve as a potential threat indicator as each event in the probable sequence or set of attacker events may typically be initiated, executed, and/or activated during a real-world attack, thereby defining a probable pattern of attacker behavior.

For instance, in a non-limiting example, based on obtaining a corpus of cybersecurity event data related to a target cybersecurity threat hunting hypothesis (e.g., attackers exploiting AWS environments are likely to engage in rapid discovery of cloud infrastructure and privilege escalation activities within a short amount of time after intrusion. Can we analyze AWS Cloud Trail Events to identify unusual or high-volume operations indicative of these actions? Activity meeting these criteria may suggest an attacker is attempting to gain higher-level access or control within a subscriber's system), S230 may function to assess the corpus of cybersecurity event data returned from S220 and identify a set of likely attacker events (e.g., application programming interface (API) calls, commands, events, etc.) commonly used by attackers for the attacker behavior (e.g., discovery of cloud infrastructure and privilege escalation, target attack behavior, etc.) defined within the target cybersecurity threat hunting hypothesis.

Figure 5:
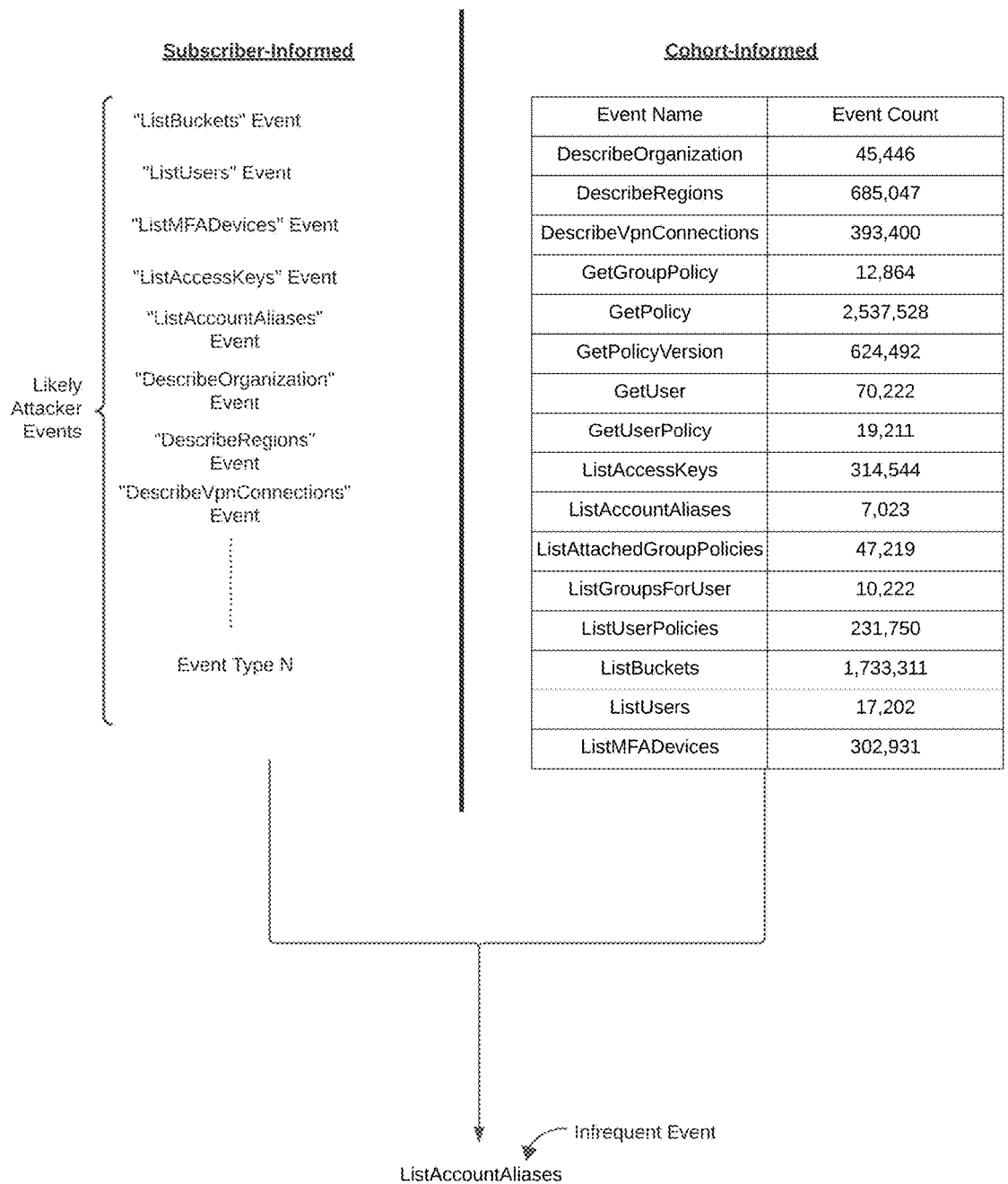
FIG. 5 illustrates an example schematic of identifying infrequent cybersecurity events in accordance with one or more embodiments of the present application.
Figure 7:
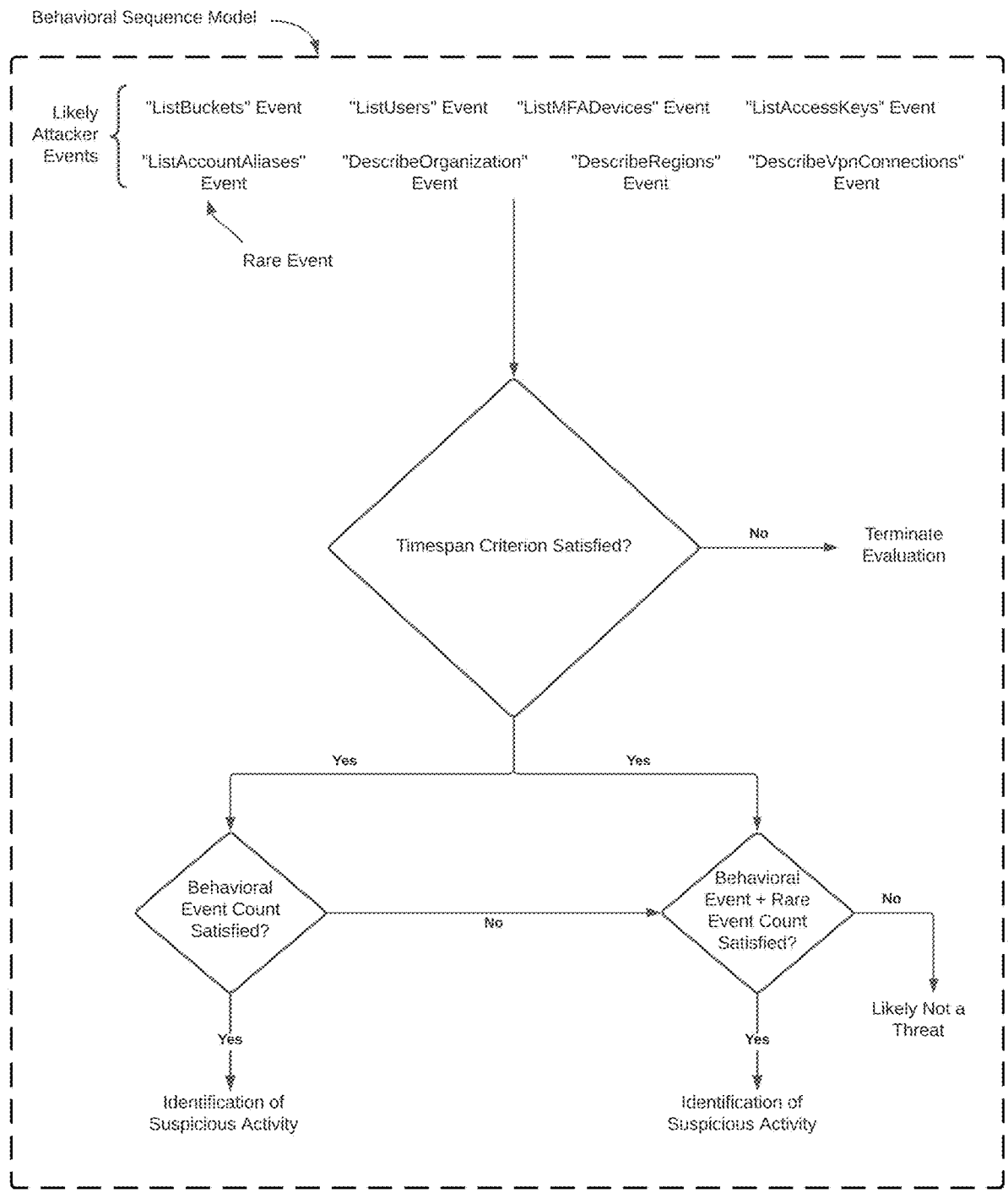
FIG. 7 illustrates an example of a behavioral sequence model in accordance with one or more embodiments of the present application.

Accordingly, in such a non-limiting example, the identified set of likely attacker events (e.g., ListBuckets event, ListUsers event, ListMFADevices event, ListAccessKeys event, ListAccountAliases event, DescribeOrganization event, DescribeRegions event, DescribeVpnConnections event) may be used to create a behavioral sequence or pattern or group that substantially represents the attacker's modus operandi, as shown generally by way of example in FIG. 4, FIG. 5, and FIG. 7.

Stated another way, in one or more embodiments, S230 may function to identify (e.g., select, detect, etc.) a set of attacker event types that are indicative of a target attack type based on or in response to assessing a corpus of raw event data of a target time span associated with one or more environments of a target subscriber. Stated differently, in one or more embodiments, S230 may function to identify (e.g., select, detect, etc.) a set of attacker commands indicative of a target attack type based on or in response to assessing a corpus of raw event data of a target time span associated with one or more environments of a target subscriber. Stated differently, in one or more embodiments, S230 may function to identify (e.g., select, detect, etc.) a set of attacker events indicative of a target attack type based on or in response to assessing a corpus of raw event data of a target time span associated with one or more environments of a target subscriber.

It shall be noted that, in one or more embodiments, the corpus of raw event data may have a large volume of distinct API calls, distinct commands and/or distinct events, exceeding thousands or even tens of thousands or records. Accordingly, at least one technical advantage of S230 is the ability to rapidly (or automatically) assess a large dataset to selectively identify a set of attacker event types (e.g., attacker events, attacker commands) indicative of the target attack type.

(ii) Identifying Infrequent Event(s)

Furthermore, in one or more embodiments, based on identifying the likely set of attacker events, S230 may function to assess a frequency occurrence of each identified attacker event of the set of likely attacker events to identify one or more infrequent events (i.e., rare events).

In such embodiments, S230 may function to obtain a collection of raw event data associated with a cohort (e.g., a plurality of subscribers) and perform an event frequency analysis on the collection of raw event data of the cohort. Accordingly, in some embodiments, S230 may function to map each distinct event type within the collection of raw event data of the cohort with a corresponding event frequency count, as shown generally by way of example in FIG. 5.

Furthermore, in some embodiments, based on identifying each distinct event type of the cohort that is below a minimum event frequency threshold value, S230 may function to identify one or more infrequent events (e.g., rare events) within the mapping. For instance, with respect to the above-mentioned non-limiting example, S230 may function to identify the "ListAccountAliases" event type as an infrequent event (i.e., rare event) based on the frequency count of the "ListAccountAliases" event type being below the predetermined minimum event frequency threshold value (e.g., eight-thousand (8,000)), as shown generally by way of example in FIG. 5.

In one or more embodiments, based on (or in response to) obtaining a set of attacker event types as generally described above, S230 may function to compute, for each attacker event type of the set of attacker event types, an event frequency count that numerically represents an occurrence of a subject attacker event type within historical raw event data of a plurality of subscribers (e.g., across all subscribers to the cybersecurity event detection and response service, a cohort of subscribers, a target set of subscribers, etc.). Accordingly, in one or more embodiments, S230 may function to identify one or more infrequent attacker event types of the set of attacker event types based on the event frequency count computed for each attacker event type of the set of attacker event types. It shall be recognized that, in one or more embodiments, the event frequency count of each infrequent attacker event type of the one or more infrequent attacker event types may be below a predetermined minimum event frequency threshold value (e.g., an infrequent attacker event type is any attacker event type that has an event frequency count below 10,000, an infrequent attacker event type is any attacker event type that has an event frequency count below 8,000, an infrequent attacker event type is any attacker event type that has an event frequency count below 7,000 etc.).

In one or more embodiments, based on (or in response to) obtaining a set of attacker commands as generally described above, S230 may function to compute, for each attacker command of the set of attacker commands, a command frequency count that numerically represents an occurrence of a subject attacker command within historical data (e.g., raw event data, log data, etc.) of a plurality of subscribers (e.g., across all subscribers to the cybersecurity event detection and response service, a cohort of subscribers, a target set of subscribers, etc.). Accordingly, in one or more embodiments, S230 may function to identify one or more infrequent attacker commands of the set of attacker commands based on the command frequency count computed for each attacker command of the set of attacker commands. It shall be recognized that, in one or more embodiments, the command frequency count of each infrequent attacker command of the one or more infrequent attacker commands may be below a predetermined minimum command frequency threshold value (e.g., an infrequent attacker command is any attacker command that has a command frequency count below 10,000, an infrequent attacker command is any attacker command that has a command frequency count below 7,000, etc.).

In one or more embodiments, based on (or in response to) obtaining a set of attacker events as generally described above, S230 may function to compute, for each attacker event of the set of attacker events, an event frequency count that numerically represents an occurrence of a subject attacker event within historical raw event data of a plurality of subscribers (e.g., across all subscribers to the cybersecurity event detection and response service, a cohort of subscribers, a target set of subscribers, etc.). Accordingly, in one or more embodiments, S230 may function to identify one or more infrequent attacker events of the set of attacker events based on the event frequency count computed for each attacker event of the set of attacker events. It shall be recognized that, in one or more embodiments, the event frequency count of each infrequent attacker event of the one or more infrequent attacker events may be below a predetermined minimum event frequency threshold value (e.g., an infrequent attacker event is any attacker event that has an event frequency count below 10,000, an infrequent attacker event is any attacker event that has an event frequency count below 7,000, etc.).

In other words, in one or more embodiments, a set of attacker events (e.g., attacker command types, attacker event types, or the like) may represent a collection of actions (e.g., API calls, commands, tasks, etc.) commonly and/or typically associated with or observed in a target type of attack. An infrequent attacker event (e.g., attacker command type, attacker event type, etc.), in one or more embodiments, may be an event that is observed less frequently than a predetermined minimum threshold indicating that it is a rare or uncommon action (e.g., event, command, etc.).

(iii) Encoding the Behavioral Sequence Model

Accordingly, in one or more embodiments, S230 may function to encode a behavioral sequence model based on the probable set of attacker events that likely represents a potential attacker behavior and the one or more infrequent events. The behavioral sequence model, in one or more embodiments, may be configured or encoded to detect, in real-time and/or retrospectively, specific patterns of digital activity that may indicate a potential threat. It shall be recognized that the phrase "behavioral sequence model" may be interchangeably referred to herein as an "attacker behavioral sequence model" or the like.

For instance, in a non-limiting example, the behavioral sequence model may be configured to flag (i.e., identify, surface, detect, etc.) potential suspicious activity that occurred and/or is occurring within digital infrastructure of the subscriber when a predetermined number of likely attacker events (e.g., one or more likely attacker events, two or more likely attacker events, three or more likely attacker events, four or more likely attacker events, five or more likely attacker events, six or more likely attacker events, etc.) of the identified set of likely attacker events occurs within a predetermined temporal threshold (e.g., one (1) hour). Additionally, or alternatively, in such a non-limiting example, the behavioral sequence model may be configured to flag (i.e., identify, surface, detect, etc.) potential suspicious activity when a subset of the identified set of likely attacker events (e.g., one or more attacker events, two or more attacker events, three or more attacker events, four or more attacker events, five or more attacker events, six or more attacker events, etc.) in combination with an infrequent event occurs within the predetermined temporal threshold, as shown generally by way of example in FIG. 7.

It shall be recognized that, in one or more embodiments, behavioral events (i.e., likely attacker events and/or the like) that do not occur frequently (i.e., infrequent events, rare events, etc.), may be weighted or valued more than likely attacker events that are not infrequent events. Therefore, with continued reference to the above non-limiting example, the behavioral sequence model may be configured to flag (i.e., identify, surface, detect, etc.) potential suspicious activity that occurred and/or is occurring within digital infrastructure of the subscriber when at least five attacker events of the identified set of likely attacker events occurs within a predetermined temporal threshold (e.g., one (1) hour). Furthermore, in such a non-limiting example, the behavioral sequence model may also be configured to flag (i.e., identify, surface, etc.) potential suspicious activity when at least three likely attacker events of the identified set of likely attacker events in combination with an infrequent event (i.e., rare event, trigger event, or the like) occurs within the predetermined temporal threshold, as shown generally by way of example in FIG. 7. That is, in such embodiments, the infrequent event may be considered (or weighted) as being equivalent to two likely attacker events.

It shall be recognized that, in alternative embodiments, the infrequent event may be considered (or weighted) as being equivalent to three likely attacker events, four likely attacker events, five likely attacker events, and/or any other suitable number of likely attacker events without departing from the scope of the disclosure. That is, in some embodiments, a behavioral sequence model may be configured and/or encoded to lower the required number of likely attacker events needed to flag (or detect) suspicious activity when an infrequent event is detected within a subject sequence of digital activity that occurs within a predetermined time span. Specifically, if an infrequent event is identified, fewer likely attacker events may need to occur within the predetermined temporal threshold to trigger an alert or detection of suspicious digital activity, as the infrequent event may be considered highly indicative of potential malicious activity when it appears in conjunction or combination with other attacker events.

In one or more embodiments of a first implementation, based on identifying a set of attacker event types indicative of a target attack type and one or more infrequent attacker event types within the set of attacker event types, S230 may function to encode and/or construct, via one or more processors, an attacker behavioral sequence model based on the set of attacker event types and the one or more infrequent attacker event types. It shall be recognized, in one or more embodiments of the first implementation, encoding and/or constructing the attacker behavioral sequence model may include constructing or encoding the attacker behavioral sequence model to output suspicious sequences of digital activity when one of a first predefined attacker-indicative condition and a second predefined attacker-indicative condition is met. The first predefined attacker-indicative condition, in one or more embodiments, may be satisfied when the attacker behavioral sequence model detects or identifies that a subject sequence of digital activity that occurred or is occurring within one or more environments of a target subscriber includes a predetermined number of attacker events (e.g., events or the like) that match or correspond to one or more attacker event types of the set of attacker event types within a predetermined timeframe. The second predefined attacker-indicative condition, in one or more embodiments, may be met when a given sequence of digital activity that occurred or is occurring within the one or more environments of the target subscriber includes (i) a predefined number of attacker events (e.g., events or the like) that match or correspond to one or more attacker event types of the set of attacker event types and (ii) one infrequent attacker event (e.g., event or the like) that matches or corresponds to one of the one or more infrequent attacker event types within the predetermined timeframe.

Stated another way, in one or more embodiments, the first predefined attacker-indicative condition may be satisfied when the attacker behavioral sequence model detects that a subject sequence of digital activity has at least five attacker events (e.g., events) of a type that match or correspond to one or more attacker event types of the set of attacker event types within a predetermined timeframe and/or the second predefined attacker-indicative condition, in one or more embodiments, may be satisfied when the attacker behavioral sequence model detects that a given sequence of digital activity has (i) three attacker events (e.g., events) of a type that match or correspond to the one or more attacker event types of the set of attacker event types within the predetermined timeframe (e.g., one hour, thirty minutes, two hours, etc.) and (ii) one infrequent attacker event (e.g., an event) that matches or corresponds to one of the one or more infrequent attacker event types within the predetermined timeframe.

In one or more embodiments of a second implementation, based on identifying a set of attacker events indicative of a target attack type and one or more infrequent attacker events within the set of attacker events, S230 may function to encode and/or construct, via one or more processors, an attacker behavioral sequence model based on the set of attacker events and the one or more infrequent attacker events. It shall be recognized, in one or more embodiments of the second implementation, encoding and/or constructing the attacker behavioral sequence model may include constructing or encoding the attacker behavioral sequence model to output suspicious sequences of digital activity when one of a first predefined attacker-indicative condition and a second predefined attacker-indicative condition is met. The first predefined attacker-indicative condition, in one or more embodiments, may be satisfied when the attacker behavioral sequence model detects or identifies that a subject sequence of digital activity that occurred or is occurring within one or more environments of a target subscriber includes a predetermined number of attacker events (e.g., events) that match or correspond to the set of attacker events within a predetermined timeframe. The second predefined attacker-indicative condition, in one or more embodiments, may be met when a given sequence of digital activity that occurred or is occurring within the one or more environments of the target subscriber includes (i) a predefined number of attacker events (e.g., events or the like) that match or correspond to the set of attacker events and (ii) one infrequent attacker event (e.g., event or the like) that matches or corresponds to one of the one or more infrequent attacker events within the predetermined timeframe.

Stated another way, in one or more embodiments, the first predefined attacker-indicative condition may be satisfied when the attacker behavioral sequence model detects that a subject sequence of digital activity has at least five attacker events (e.g., five events) that match or correspond to the set of attacker events within a predetermined timeframe and/or the second predefined attacker-indicative condition, in one or more embodiments, may be satisfied when the attacker behavioral sequence model detects that a given sequence of digital activity has (i) three attacker events (e.g., three events) that match or correspond to the set of attacker events within the predetermined timeframe (e.g., one hour, thirty minutes, two hours, etc.) and (ii) one infrequent attacker event (e.g., one event) that matches or corresponds to one of the one or more infrequent attacker events within the predetermined timeframe.

In one or more embodiments of a third implementation, based on identifying a set of attacker commands indicative of a target attack type and one or more infrequent attacker commands within the set of attacker commands, S230 may function to encode and/or construct, via one or more processors, an attacker behavioral sequence model based on the set of attacker commands and the one or more infrequent attacker commands. It shall be recognized, in one or more embodiments of the third implementation, encoding and/or constructing the attacker behavioral sequence model may include constructing or encoding the attacker behavioral sequence model to output suspicious sequences of digital activity when one of a first predefined attacker-indicative condition and a second predefined attacker-indicative condition is met. The first predefined attacker-indicative condition, in one or more embodiments, may be satisfied when the attacker behavioral sequence model detects or identifies that a subject sequence of digital activity that occurred or is occurring within one or more environments of a target subscriber includes a predetermined number of attacker commands (e.g., commands or the like) that match or correspond to the set of attacker commands within a predetermined timeframe. The second predefined attacker-indicative condition, in one or more embodiments, may be met when a given sequence of digital activity that occurred or is occurring within the one or more environments of the target subscriber includes (i) a predefined number of attacker commands (e.g., commands or the like) that match or correspond to the set of attacker commands and (ii) one infrequent attacker commands (e.g., a command or the like) that matches or corresponds to one of the one or more infrequent attacker commands within the predetermined timeframe.

Stated another way, in one or more embodiments, the first predefined attacker-indicative condition may be satisfied when the attacker behavioral sequence model detects that a subject sequence of digital activity has at least five attacker commands (e.g., five commands) that match or correspond to the set of attacker commands within a predetermined timeframe and/or the second predefined attacker-indicative condition, in one or more embodiments, may be satisfied when the attacker behavioral sequence model detects that a given sequence of digital activity has (i) three attacker commands (e.g., three commands) that match or correspond to the set of attacker commands within the predetermined timeframe (e.g., one hour, thirty minutes, two hours, etc.) and (ii) one infrequent attacker commands (e.g., one command) that matches or corresponds to one of the one or more infrequent attacker commands within the predetermined timeframe.

Accordingly, in one or more embodiments of the first implementation, the second implementation, the third implementation, or any other suitable implementation, constructing or encoding, via one or more processors, the attacker behavioral sequence model may include (e.g., automatically) encoding the attacker behavioral sequence model to output suspicious digital activity, suspicious sequences of digital activity, and/or the like when any one of a plurality of predefined attacker-indicative conditions is satisfied. Accordingly, in such embodiments, the plurality of predefined attacker-indicative conditions may be configured to value infrequent attacker event types (e.g., attacker commands, attacker events, etc.) with greater significance than any attacker event type (e.g., attacker commands, attacker events, etc.) of the set of attacker event types (e.g., the set of attacker commands, the set of attacker events, etc.) that are not classified or identified as infrequent attacker event types (e.g., the set of attacker commands, the set of attacker events, etc.).

Behavioral Sequence Model+Auxiliary Enrichment Signals

Additionally, or alternatively, in one or more embodiments, S230 may function to pair the encoded behavioral sequence model with one or more auxiliary enrichment signals (e.g., supplemental signals, weak signals, contextual datasets, etc.). The one or more auxiliary enrichment signals, as generally referred to herein, may augment the behavioral sequence model by applying one or more additional contextual layers to enhance a performance of the behavioral sequence model's ability to accurately identify and/or flag suspicious activities that occurred and/or is occurring within digital infrastructure and/or one or more environments of a target subscriber.

In one or more embodiments, the behavioral sequence model may be paired and/or joined with a rare autonomous system numbers (ASNs) contextual dataset (e.g., a rare ASN auxiliary enrichment signal). A rare ASN auxiliary enrichment signal, as generally referred to herein, may be a dataset and/or a signal that includes infrequently used ASNs or suspicious ASNs of a target subscriber to which the cybersecurity threat hunting hypothesis corresponds. In such embodiments, the rare ASN auxiliary enrichment signal may serve as a filtering mechanism to reduce the noise of potential suspicious activity data flagged (or identified) by the behavioral sequence model, as shown generally by way of example in FIG. 10.

Figure 11:
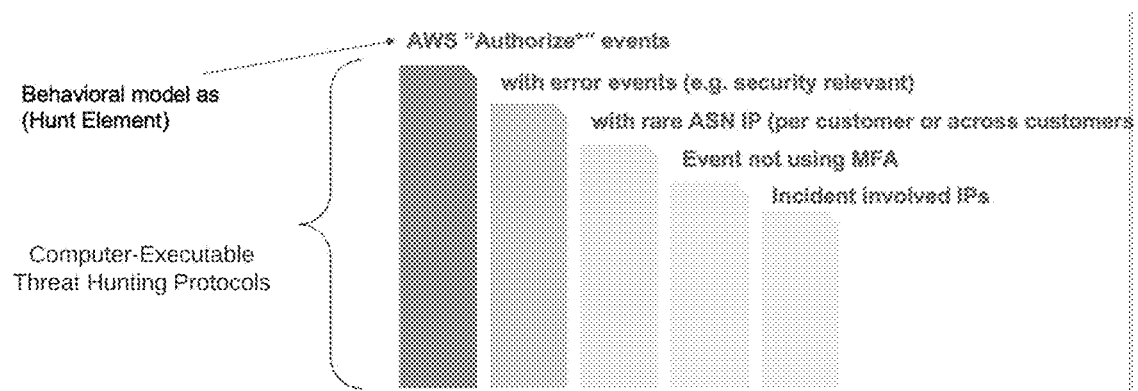
FIG. 11 illustrates an example of rapidly modifying a pre-existing computer-executable threat hunting protocol and/or creating one or more additional computer-executable threat hunting protocols in accordance with one or more embodiments of the present application.

In one or more embodiments, the behavioral sequence model may be paired and/or joined with a rare autonomous system numbers (ASNs) contextual dataset (e.g., a rare ASN auxiliary enrichment signal). A rare ASN auxiliary enrichment signal, as generally referred to herein, may be a dataset and/or a signal that includes infrequently used ASNs or suspicious ASNs of a plurality of subscribers to the cybersecurity event detection and response service. In such embodiments, the rare ASN auxiliary enrichment signal may serve as a filtering mechanism to reduce the noise of potential suspicious activity data flagged (or identified) by the behavioral sequence model, as shown generally by way of example in FIG. 11.

In one or more embodiments, the behavioral sequence model may be paired and/or joined with a previously unseen autonomous system numbers (ASNs) contextual dataset (e.g., a rare ASN auxiliary enrichment signal). A previously unseen ASN auxiliary enrichment signal, as generally referred to herein, may be a dataset and/or a signal that includes information about ASNs that have not been previously observed in historical event data of a target subscriber to which the cybersecurity threat hunting hypothesis corresponds. In such embodiments, the unseen ASN auxiliary enrichment signal may serve as a filtering mechanism to reduce the noise of potential suspicious activity data flagged (or identified) by the behavioral sequence model.

In one or more embodiments, the behavioral sequence model may be paired and/or joined with a rare user agents' contextual dataset. A rare user agent auxiliary enrichment signal, as generally referred to herein, may be a dataset and/or a signal that includes infrequently used user agents or suspicious user agents of a target subscriber to which the cybersecurity threat hunting hypothesis corresponds. In such embodiments, the rare user agent auxiliary enrichment signal may serve as a filtering mechanism to reduce the noise of potential suspicious activity data flagged (or identified) by the behavioral sequence model.

In one or more embodiments, the behavioral sequence model may be paired and/or joined with a contextual dataset of error events (e.g., error event auxiliary signal). An error event auxiliary signal, as generally referred to herein, may be a dataset and/or a signal that includes suspicious error events occurring within an environment of a target subscriber. In such embodiments, the error event auxiliary signal may serve as a filtering mechanism to reduce the noise of potential suspicious activity data flagged (or identified) by the behavioral sequence model, as shown generally by way of example in FIG. 11.

In one or more embodiments, the behavioral sequence model may be paired and/or joined with a contextual dataset of historical ASNs or User Agents that may have been observed or identified within a predetermined time span (i.e., past month, past quarter, etc.). In other words, the contextual dataset (i.e., auxiliary enrichment signal) may include data related to the frequency, patterns, and/or anomalies of ASNs or User Agents over a specific historical period of a target subscriber. In such instances, the auxiliary enrichment signal may serve as a filtering mechanism to identify suspicious patterns or suspicious behaviors based on an assessment or evaluation of current environment activity against previous environment activity.

That is, in one or more embodiments, using the behavioral sequence model and the one or more auxiliary enrichment signals, the computer-executable threat hunting protocol may be configured or encoded to efficiently and effectively identify suspicious activity that is occurring and/or has occurred within a target subscriber's digital infrastructure. It shall be recognized that the configuration of the computer-executable threat hunting protocol provides flexibility to rapidly adapt to different cybersecurity threat hunting hypotheses, as shown generally by way of example in FIG. 11.

For instance, in one or more embodiments, encoding a computer-executable threat hunting protocol may further include digitally pairing, digitally tethering, or digitally associating a target attacker behavioral sequence model with one or more auxiliary enrichment datasets. In such embodiments, the computer-executable threat hunting protocol, when executed, may function to use (e.g., execute or the like) the target attacker behavioral sequence model to output a first set of suspicious sequences of digital activity that satisfies predetermined criteria of the target attacker behavioral sequence model in response to executing the computer-executable threat hunting protocol. Furthermore, in such an embodiment, the computer-executable threat hunting protocol may use the one or more auxiliary enrichment datasets digitally paired with the target attacker behavioral sequence model to pare down the first set of suspicious sequences of digital activity to a refined set of suspicious sequences of digital activity that is less likely to include false positives, more accurately reflect actual or genuine malicious behavior, and/or more accurately reflect potential threats (e.g., less rows of data or the like).

It shall be recognized, in one or more embodiments, a subject computer-executable threat hunting protocol may be encoded to include a target attacker behavioral sequence model and one or more one or more auxiliary enrichment datasets. In other words, the target attacker behavioral sequence model may be digitally paired with one or more auxiliary enrichment datasets. For instance, in a non-limiting example, the one or more auxiliary enrichment datasets may include a first distinct auxiliary enrichment dataset, a second distinct auxiliary enrichment dataset, and a third distinct auxiliary enrichment dataset (e.g., the first distinct auxiliary enrichment dataset (e.g., rare ASN dataset), the second distinct auxiliary enrichment dataset (e.g., error events dataset), and the third distinct auxiliary enrichment dataset (e.g., IP addresses associated with security incidents) are different datasets that provide complementary information (e.g., data) to enhance the accuracy and effectiveness of the subject computer-executable threat hunting protocol instead of solely using the behavioral sequence model.

2.40 Executing the Computer-Executable Threat Hunting Protocol

S240, which includes executing the computer-executable threat hunting protocol, may function to execute, via one or more processing devices, the computer-executable threat hunting protocol encoded by S230. In one or more embodiments, based on the execution of the computer-executable threat hunting protocol, S240 may function assess a corpus of historical cybersecurity event data of a target time span (i.e., past thirty (30) days of log data, past sixty (60) of log data, or the like) and, in turn, identify suspicious activity for further investigation using the behavioral sequence model and the one or more auxiliary enrichment signals of the computer-executable threat hunting protocol. It shall be recognized that the computer-executable threat hunting protocol may be executed on any suitable computing environment including, but not limited to, servers, personal computers, cloud-based computing platforms, distributed computing systems, and/or the like.

In one or more embodiments, the computer-executable threat hunting protocol, when executed, may function in one or more threat hunting stages. In one or more embodiments, one of the threat hunting stages includes using the behavioral sequence model to identify a corpus of suspicious digital event activity within the corpus of historical cybersecurity event data. Accordingly, in one or more embodiments, the computer-executable threat hunting protocol may use the one or more auxiliary enrichment signals contemporaneously with the behavioral sequence model or in a subsequent threat hunting stage to pare down or filter the corpus of suspicious digital event activity to a high-fidelity subset of hunting leads.

Figure 10:
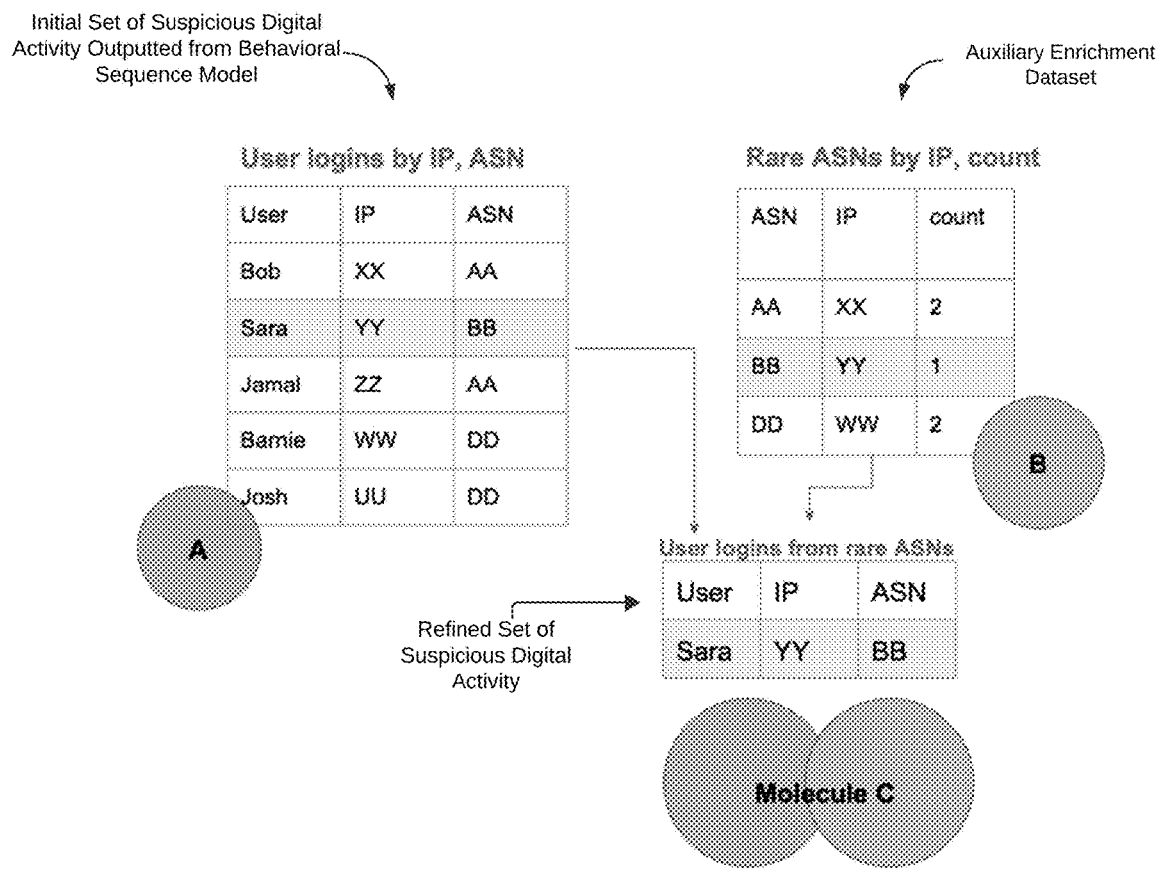
FIG. 10 illustrates an example output of a computer-executable threat hunting protocol in accordance with one or more embodiments of the present application.

For instance, as shown generally by way of the non-limiting example illustrated in FIG. 10, based on executing a subject computer-executable threat hunting protocol associated with identifying suspicious user logins from rare ASNs, the behavioral sequence model of the subject computer-executable threat hunting protocol may function to query a corpus of historical cybersecurity event data of a subject subscriber and, in turn, return a corpus of suspicious cybersecurity activity data that satisfies the behavioral sequence model. In such a non-limiting example, the corpus of suspicious cybersecurity activity data may include n-number of distinct users in which each user is associated with a corresponding internet protocol (IP) address and a corresponding ASN. Additionally, in such embodiments, the behavioral sequence model may be paired with a rare ASN contextual dataset that includes n-number of distinct ASNs in which each distinct ASN corresponds to a subject IP address and an observed frequency value (i.e., a count of the number of times a subject ASN was observed in digital infrastructure of the subscriber). Accordingly, using the rare ASN contextual dataset, the subject computer-executable threat hunting protocol may function to pare down (i.e., filter or the like) the corpus of suspicious cybersecurity activity data that satisfies the behavioral sequence model to a subset of high-fidelity hunting leads, as shown generally by way of example in FIG. 10. It shall be recognized that the rare ASN contextual dataset may include ASN data associated with only a subscriber environment to which the subject computer-executable threat hunting protocol corresponds or may include ASN data associated with all subscribers subscribing to the cybersecurity event detection and response service.

For instance, in another non-limiting example, based on executing a subject computer-executable threat hunting protocol associated with identifying malicious users using SharePoint to exfiltrate data, the behavioral sequence model of the subject computer-executable threat hunting protocol may function to query a corpus of historical cybersecurity event data of a subject subscriber and, in turn, return a corpus of suspicious cybersecurity activity data that satisfies the behavioral sequence model. In such a non-limiting example, the suspicious cybersecurity activity data may include groupings of download events by users where there were more than one thousand (1000) download events within one hour. Furthermore, in such embodiments, the behavioral sequence model may be paired with a rare ASN contextual dataset. Accordingly, using the rare ASN contextual dataset, the subject corpus of suspicious cybersecurity activity data may function to pare down (i.e., filter or the like) the groupings of download events by users where there were more than one thousand (1000) download events to a subset of high-fidelity hunting leads.

Stated another way, in one or more embodiments, the computer-executable threat hunting protocol may function to initially identify suspicious activity data followed by refinement of the suspicious activity data to identify high-fidelity hunting leads for a more efficient and effective threat hunting process. At least one technical advantage of the computer-executable threat hunting protocol enables a minimization of false positives, while ensuring that genuine (or malicious) threats are not overlooked.

In one or more embodiments, a subject computer-executable threat hunting protocol may include a behavioral sequence model paired with one or more auxiliary enrichment datasets. Accordingly, in response to executing the subject computer-executable threat hunting protocol, the behavioral sequence model may output a first set of suspicious sequences of digital activity that satisfies predetermined criteria of the behavioral sequence model. Furthermore, in one or more embodiments, the subject computer-executable threat hunting protocol may use the one or more auxiliary enrichment datasets paired with the behavioral sequence model to pare down the first set of suspicious sequences of digital activity to a refined set of suspicious sequences of digital activity. Moreover, in one or more embodiments, the refined set of suspicious sequences of digital activity may (e.g., only) be surfaced to a target user via a user interface or the like.

Stated differently, in one or more embodiments, the behavioral sequence model of the subject computer-executable threat hunting protocol may output a first set of suspicious sequences of digital activity that satisfies predetermined criteria of the behavioral sequence model in response to executing the subject computer-executable threat hunting protocol and, in turn, the subject computer-executable threat hunting protocol may use an auxiliary enrichment dataset to adapt the first set of suspicious sequences of digital activity to a refined set of suspicious sequences of digital activity by automatically assessing each suspicious sequence of digital activity of the first set of suspicious sequences of digital activity against security data within one or more columns of the auxiliary enrichment dataset.

In one or more embodiments, a subject computer-executable threat hunting protocol may include a behavioral sequence model paired with an auxiliary enrichment dataset.

In one or more embodiments, in response to executing the subject computer-executable threat hunting protocol, the attacker behavioral sequence model may output a first set of suspicious sequences of digital activity that satisfies predetermined criteria of the attacker behavioral sequence model. Furthermore, in such an embodiment, the computer-executable threat hunting protocol may use the auxiliary enrichment dataset to filter out and remove a subset of suspicious sequences of digital activity of the first set of suspicious sequences of digital activity that do not meet a count-based threshold criterion based on a count-based feature included in the auxiliary enrichment dataset, as shown generally by way of example in FIG. 10. Thus, in one or more embodiments, generating a refined set of suspicious sequences of digital activity.

In one or more embodiments, a subject computer-executable threat hunting protocol may include a behavioral sequence model paired with an auxiliary enrichment dataset. In one or more embodiments, in response to executing the subject computer-executable threat hunting protocol, the attacker behavioral sequence model may output a first set of suspicious sequences of digital activity that satisfies predetermined criteria of the attacker behavioral sequence model. Furthermore, in such an embodiment, the computer-executable threat hunting protocol may automatically perform a dataset intersection operation, or a dataset join operation between the first set of suspicious sequences of digital activity and the auxiliary enrichment dataset to remove suspicious sequences of digital activity from the first set of suspicious sequences of digital activity that do not intersect with the auxiliary enrichment dataset. Thus, in one or more embodiments, generating a refined set of suspicious sequences of digital activity. Stated differently, in one or more embodiments, the computer-executable threat hunting protocol may refine the first set of suspicious sequences of digital activity by cross-referencing it with data (e.g., security data or the like) included in the auxiliary enrichment dataset, retaining only suspicious sequences of digital activity that are validated by the auxiliary enrichment dataset.

In one or more embodiments, a subject computer-executable threat hunting protocol may use a behavioral sequence model and one or more auxiliary enrichment datasets to enhance the identification and refinement of suspicious sequences of digital activity. When executed, the behavioral sequence model may output an initial set of suspicious sequences of digital activity that satisfies predefined attacker-indicative criteria of the behavioral sequence model. The auxiliary enrichment datasets may then be used to refine the initial set of suspicious sequences of digital activity through filtering based on count-based thresholds based on one or more count-based features of the one or more auxiliary enrichment datasets, performing dataset intersections or joins of the one or more auxiliary enrichment datasets, removing sequences that do not match specific patterns or criteria, and cross-referencing with additional security data or other relevant attributes contained within the one or more auxiliary enrichment datasets.

In a non-limiting embodiment, a system or service (e.g., cybersecurity event detection and response service) implementing method 200 may function to receive, via one or more processors, a request to execute a computer-executable threat hunting protocol that includes at least one behavioral sequence model and at least one auxiliary enrichment dataset. In one or more embodiments, in response to receiving the request, S240 may function to execute the computer-executable threat hunting protocol to assess digital activity data associated with one or more environments of a subscriber to the cybersecurity event detection and response service. It shall be noted that, in one or more embodiments, executing the computer-executable threat hunting protocol may include executing the at least one behavioral sequence model that may function to output an initial set of likely suspicious digital activity that occurred within the one or more environments of the subscriber that satisfies one or more predetermined attacker-indicative conditions of the at least one behavioral sequence model, assessing the initial set of likely suspicious digital activity outputted by the at least one behavioral sequence model against the at least one auxiliary enrichment dataset to identify a subset of the initial set of likely suspicious digital activity that is not suspicious, and/or outputting a refined set of suspicious digital activity by removing the subset of the initial set of likely suspicious digital activity that is not suspicious from the initial set of likely suspicious digital activity.

It shall be recognized, in one or more embodiments, the at least one behavioral sequence model may include a first behavioral sequence model that is configured to detect suspicious digital activity that corresponds to a first distinct attack type (e.g., first distinct attack vector type) and a second behavioral sequence model that is configured to detect suspicious digital activity that corresponds to a second distinct attack type (e.g., second distinct attack vector type). For instance, in a non-limiting example, the first behavioral sequence model may be configured to detect suspicious digital activity associated with a privilege escalation attack in a cloud environment (e.g., unauthorized creation of administrative accounts or modification of access controls) and the second behavioral sequence model may be configured to detection suspicious digital activity associated with data exfiltration-type attacks (e.g., large volumes of data being transferred to external locations or unusual patterns of data access).

It shall be further recognized, in one or more embodiments, the at least one auxiliary enrichment dataset may include a first distinct auxiliary enrichment dataset, a second distinct auxiliary enrichment dataset, and/or a third distinct auxiliary enrichment dataset. The first distinct auxiliary enrichment dataset, in one or more embodiments, may include contextual data related to error events. The second distinct auxiliary enrichment dataset, in one or more embodiments, may include contextual data related to infrequently used autonomous system numbers (ASN) and internet protocol (IP) addresses across all subscribers or a select subset of subscribers to the cybersecurity event detection and response service in which infrequently used autonomous system number and each infrequently used internet protocol address is below a low-usage count threshold (e.g., five or less, ten or less, fifteen or less, twenty or less, etc.). The third distinct auxiliary enrichment dataset, in one or more embodiments, may include contextual data related to the internet protocol (IP) addresses involved in cybersecurity incidents. Each distinct auxiliary enrichment dataset, in one or more embodiments, may function to tune or refine the output of the behavioral sequence model. By providing additional auxiliary enrichment datasets, such as error events, infrequently used ASNs, or IP addresses associated with cybersecurity incidents, these datasets may enable the computer-executable threat hunting protocol to filter out digital activity sequences outputted by the behavioral sequence model that are not indicative of genuine threats. Auxiliary enrichment datasets, in some embodiments, are weak signals when considered individually that do not necessarily point to malicious intent, however, when these weak signals (e.g., auxiliary enrichment datasets) are integrated or paired with the behavioral sequence model, they assist the computer-executable threat hunting protocol with returning probative threat hunting leads (e.g., high-fidelity threat hunting leads).

It shall be further noted, in one or more embodiments, the system or service implementing method 200 may function to (e.g., only) surface, via a graphical user interface, the refined set of suspicious digital activity in response to executing the computer-executable threat hunting protocol.

It shall be further noted that, in one or more embodiments, the above-mentioned behavioral sequence model or any other behavioral sequence model (e.g., attacker-indicative behavioral sequence model, attacker behavioral sequence model, etc.) may include a set of computer-executable instructions that, when executed, executes an automated sequence of tasks that automatically queries one or more corpora of historical event data of a target subscriber of a predetermined time span (e.g., past thirty days, past sixty days, etc.) based on predetermined attacker-indicative conditions of the above-mentioned behavioral sequence model and, in turn, automatically returns an initial set of likely suspicious digital activity that occurred within one or more environments of the target subscriber in response to querying the one or more corpora of historical event data. In such an embodiment, a computer-executable threat hunting protocol or the like may function to execute the set of computer-executable instructions encoded into a given behavioral sequence model associated with or corresponds to the computer-executable threat hunting protocol.

Additionally, or alternatively, in one or more embodiments, a system or service implementing method 200 may function to execute a computer-executable threat hunting protocol that includes a behavioral sequence model paired with an auxiliary enrichment dataset. Accordingly, in such embodiments, in response to executing the computer-executable threat hunting protocol (e.g., the behavioral sequence model), the behavioral sequence model may output a set of suspicious digital users (e.g., suspicious user accounts or the like) that satisfies one or more attacker-indicative conditions of the behavioral sequence model in analogous ways as described above.

Additionally, or alternatively, in such an embodiment, the computer-executable threat hunting protocol may use the auxiliary enrichment dataset (e.g., a dataset of IP addresses that were used in cybersecurity incidents, a dataset of events that where multi-factor authentication was not used, etc.) to further refine or tune or adapt the output of the behavioral sequence model. For instance, in a non-limiting example, the computer-executable threat hunting protocol may generate a refined set of suspicious digital users (e.g., refined set of suspicious digital accounts or the like) based on assessing the set of suspicious digital users outputted by the behavioral sequence model against the auxiliary enrichment dataset in analogous ways as described above. The refined set of suspicious digital users, in one or more embodiments, may be a subset, less than the maximum or full size of the set of suspicious digital users outputted by the behavioral sequence model.

Accordingly, in one or more embodiments, for each suspicious digital user (e.g., each suspicious digital user account, etc.) of the refined set of suspicious digital users, a system or service implementing method 200 may function to collect additional user data related to a subject suspicious user account when the refined set of suspicious digital users includes users who behavior (e.g., digital activity) meets or exceeds the one or more attacker-indicative conditions of the behavioral sequence model and/or criteria of the auxiliary enrichment dataset. In some embodiments, the additional user data may include one or more of a username of the subject suspicious user account, an email address of the subject suspicious user account, a user identification of the subject suspicious user account, a job title of the subject suspicious user account, a department that the subject suspicious user account is associated with or assigned to, or any other suitable information. For instance, in a non-limiting example, if the suspicious user account (john.doe@acme.com) was identified in the refined set of suspicious digital users, the system or service may function to collect additional information pertaining to the user and/or the user account associated with john.doe@acme.com such as the corresponding username (e.g., johnathaon.doe@acme.com), a corresponding user identification (e.g., Oa6543123), a corresponding department that the user is assigned to (e.g., Human Resources), a corresponding display name (e.g., John Doe), a corresponding city, state, and/or country of the user (e.g., Austin, Texas, United States), a corresponding office location of the user account (e.g., United States-Headquarters), and any group accounts to which the user account and/or user is a member.

It shall be noted that the system or service implementing method 200 may function to obtain the additional data by executing one or more automated investigation workflows. The additional data, in some embodiments, may be used to assess a threat and/or assign a degree of threat severity to a subject suspicious or compromised user account.

It shall be further noted that, in one or more embodiments, the system or service implementing method 200 may function to automatically disable one or more compromised user accounts or suspicious digital user accounts identified within the refined set of suspicious digital users by automatically configuring and executing one or more application programming interface requests. Stated another way, in one or more embodiments, the system or service implementing method 200 may function to initiate and/or execute one or more threat mitigation responses that resolves at least one security threat involving one or more environments of the subscriber based on the refined set of suspicious digital activity.

2.50 Surfacing High-Fidelity Hunting Leads

S250, which includes surfacing high-fidelity hunting leads, may function to surface, via one or more graphical user interfaces, a set of high-fidelity hunting leads based on the execution of a subject computer-executable threat hunting protocol. A high-fidelity hunting lead, as generally referred to herein, may be a specific record or instance or sequence of suspicious activity that has been identified as a potential cybersecurity threat based on the execution of a subject computer-executable threat hunting protocol. Stated another way, in one or more embodiments, each high-fidelity hunting lead may represent a distinct suspicious event or a sequence of suspicious events within a system or network of a subject subscriber that corresponds to a target cybersecurity threat hunting hypothesis. It shall be recognized that the phrase "high-fidelity hunting leads" may be interchangeable referred to herein as "probative hunting leads."

In one or more embodiments, based on or in response to identifying a set of high-fidelity hunting leads (e.g., probative threat hunting leads and/or the like), S250 may function to surface the set of high-fidelity hunting leads via a cybersecurity hunting intelligence graphical user interface. The cybersecurity hunting intelligence graphical user interface, in one or more embodiments, may include a hunt findings region that includes a cybersecurity hunt summary (i.e., the hunt hypothesis, the hunt description, and/or the like). Furthermore, in some embodiments, the hunt findings region may include the set of high-fidelity hunting leads outputted from the execution of a subject computer-executable threat hunting protocol. Additionally, or alternatively, in some embodiments, S250 may function to tag each high-fidelity hunting lead of the set of high-fidelity hunting leads into one of a plurality of hunting lead categories (i.e., a malicious hunting lead category (i.e., malicious events requiring immediate attention), a suspicious hunting lead category (i.e., suspicious events requiring further validation), a notable hunting lead category (i.e., notable events for the subscriber's attention), etc.).

Additionally, or alternatively, in one or more embodiments, S250 may function to execute one or more automated investigation workflows of a plurality of distinct automated investigation workflows that, when executed, automatically performs a collection of automated investigative actions that sources and/or obtains additional context data about a target entity or the like, as described in U.S. patent application Ser. No. 17/488,800, filed on 29 Sep. 2021, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated herein in its entirety by this reference.

Additionally, or alternatively, in one or more embodiments, S250 may function to automatically (or system-generate) one or more cybersecurity threat hunting dashboards and surface the one or more cybersecurity threat hunting dashboards to a target subscriber of a subject cybersecurity hunting hypothesis in analogous ways as described in U.S. patent application Ser. No. 17/591,185, filed 2 Feb. 2022, titled SYSTEMS AND METHODS FOR CYBER SECURITY THREAT DETECTION AND EXPEDITED GENERATION OF INVESTIGATION STORYBOARDS USING INTELLIGENT CYBERSECURITY AUTOMATIONS, which is incorporated herein in its entirety by this reference.

It shall be recognized, in one or more embodiments, a system or service implementing method 200 may function to mitigate, via one or more processors, one or more security threats (e.g., cybersecurity threats) associated with at least a subset of suspicious sequences of digital activity based on, contemporaneously, or in response to surfacing the suspicious sequences of digital activity that occurred in one or more environments of the subscriber.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-program product embodied in a non-transitory machine-readable storage medium storing computer instructions that, when executed by one or more processors, perform operations comprising:
   sourcing, from a computer database, a corpus of raw event data that includes digital activity that occurred within one or more environments of a target subscriber;
   identifying a set of attacker event types indicative of a target attack type based on assessing the corpus of raw event data of the target subscriber, wherein the set of attacker event types are used in a majority of real-world attacks of the target attack type;
   computing, for each attacker event type of the set of attacker event types, an event frequency count that numerically represents an occurrence of a subject attacker event type within historical raw event data of a plurality of subscribers;
   identifying one or more infrequent attacker event types of the set of attacker event types based on the event frequency count computed for each attacker event type of the set of attacker event types, wherein the event frequency count of each infrequent attacker event type of the one or more infrequent attacker event types is below a predetermined minimum event frequency threshold value;

encoding a computer-executable threat hunting protocol configured to identify suspicious digital activity of the target attack type in the one or more environments of the target subscriber, wherein encoding the computer-executable threat hunting protocol includes:
constructing an attacker behavioral sequence model based on the set of attacker event types and the one or more infrequent attacker event types; and
surfacing, via a graphical user interface, suspicious sequences of digital activity that occurred in the one or more environments of the target subscriber in response to executing the computer-executable threat hunting protocol, wherein:
executing the computer-executable threat hunting protocol includes executing, via the one or more processors, the attacker behavioral sequence model,
executing the attacker behavioral sequence model includes assessing a target corpus of raw event data of a target timespan of the target subscriber to identify a plurality of suspicious sequences of digital activity within the target corpus of raw event data that satisfy predefined attacker-indicative conditions of the attacker behavioral sequence model, and
the suspicious sequences of digital activity include the plurality of suspicious sequences of digital activity identified by the attacker behavioral sequence model.

2. The computer-program product according to claim 1, wherein:
constructing the attacker behavioral sequence model includes encoding the attacker behavioral sequence model to output the suspicious sequences of digital activity when one of a first predefined attacker-indicative condition and a second predefined attacker-indicative condition is met,
the first predefined attacker-indicative condition is met when a subject sequence of digital activity that occurred or is occurring within the one or more environments of the target subscriber includes a predetermined number of attacker events that match or correspond to one or more attacker event types of the set of attacker event types within a predetermined timeframe, and
the second predefined attacker-indicative condition is met when the subject sequence of digital activity that occurred or is occurring within the one or more environments of the target subscriber includes (i) a predefined number of attacker events that match or correspond to one or more attacker event types of the set of attacker event types and (ii) one infrequent attacker event that matches or corresponds to one of the one or more infrequent attacker event types within the predetermined timeframe.

3. The computer-program product according to claim 1, wherein:
constructing the attacker behavioral sequence model includes encoding the attacker behavioral sequence model to output the suspicious sequences of digital activity when one of a first predefined attacker-indicative condition and a second predefined attacker-indicative condition is met,
the first predefined attacker-indicative condition is satisfied when the attacker behavioral sequence model detects that a subject sequence of digital activity has at least five attacker events of a type that match or correspond to one or more attacker event types of the set of attacker event types within a predetermined timeframe, and
the second predefined attacker-indicative condition is satisfied when the attacker behavioral sequence model detects that a given sequence of digital activity has (i) three attacker events of a type that match or correspond to the one or more attacker event types of the set of attacker event types within the predetermined timeframe and (ii) one infrequent attacker event that matches or corresponds to one of the one or more infrequent attacker event types within the predetermined timeframe.

4. The computer-program product according to claim 1, wherein:
constructing the attacker behavioral sequence model includes encoding the attacker behavioral sequence model to output the suspicious sequences of digital activity when any one of a plurality of predefined attacker-indicative conditions is satisfied, and
the plurality of predefined attacker-indicative conditions is configured to value the one or more infrequent attacker event types with greater significance than any attacker event type of the set of attacker event types that are not classified or identified as infrequent attacker event types.

5. The computer-program product according to claim 1, wherein:
encoding the computer-executable threat hunting protocol further includes digitally pairing the attacker behavioral sequence model with one or more auxiliary enrichment datasets,
the attacker behavioral sequence model outputs a first set of suspicious sequences of digital activity that satisfies predetermined criteria of the attacker behavioral sequence model in response to executing the computer-executable threat hunting protocol,
the computer-executable threat hunting protocol uses the one or more auxiliary enrichment datasets digitally paired with the attacker behavioral sequence model to pare down the first set of suspicious sequences of digital activity to a refined set of suspicious sequences of digital activity, and
surfacing the suspicious sequences of digital activity includes only surfacing the refined set of suspicious sequences of digital activity.

6. The computer-program product according to claim 5, wherein:
the one or more auxiliary enrichment datasets includes:
a first distinct auxiliary enrichment dataset,
a second distinct auxiliary enrichment dataset, and
a third distinct auxiliary enrichment dataset, and
the first distinct auxiliary enrichment dataset, the second distinct auxiliary enrichment dataset, and the third distinct auxiliary enrichment dataset are different datasets.

7. The computer-program product according to claim 1, wherein:
encoding the computer-executable threat hunting protocol further includes digitally pairing the attacker behavioral sequence model with an auxiliary enrichment dataset,
the attacker behavioral sequence model outputs a first set of suspicious sequences of digital activity that satisfies predetermined criteria of the attacker behavioral sequence model in response to executing the computer-executable threat hunting protocol, and the computer-executable threat hunting protocol uses the auxiliary enrichment dataset to adapt the first set of suspicious sequences of digital activity to a refined set of suspicious sequences of digital activity by automatically assessing each suspicious sequence of digital activity of the first set of suspicious sequences of digital activity against security data within one or more columns of the auxiliary enrichment dataset.

8. The computer-program product according to claim 1, wherein:
encoding the computer-executable threat hunting protocol further includes digitally pairing the attacker behavioral sequence model with an auxiliary enrichment dataset,
the attacker behavioral sequence model outputs a first set of suspicious sequences of digital activity that satisfies predetermined criteria of the attacker behavioral sequence model in response to executing the computer-executable threat hunting protocol, and
the computer-executable threat hunting protocol uses the auxiliary enrichment dataset to filter out and remove a subset of suspicious sequences of digital activity of the first set of suspicious sequences of digital activity that do not meet a count-based threshold criterion based on a count-based feature included in the auxiliary enrichment dataset.

9. The computer-program product according to claim 1, wherein:
encoding the computer-executable threat hunting protocol further includes digitally pairing the attacker behavioral sequence model with an auxiliary enrichment dataset,
the attacker behavioral sequence model outputs a first set of suspicious sequences of digital activity that satisfies predetermined criteria of the attacker behavioral sequence model in response to executing the computer-executable threat hunting protocol, and
the computer-executable threat hunting protocol performs a dataset intersection operation between the first set of suspicious sequences of digital activity and the auxiliary enrichment dataset to remove suspicious sequences of digital activity from the first set of suspicious sequences of digital activity that do not intersect with the auxiliary enrichment dataset.

10. A computer-program product embodied in a non-transitory machine-readable storage medium storing computer instructions that, when executed by one or more processors, perform operations comprising:
identifying a set of attacker commands indicative of a target attack type based on assessing a corpus of historical raw event data of a subscriber, wherein the set of attacker commands are used in a majority of real-world attacks of the target attack type;
computing, for each attacker command of the set of attacker commands, an attacker command frequency count that numerically represents an occurrence of a subject attacker command within historical raw event data of a plurality of subscribers;
identifying one or more infrequent attacker commands of the set of attacker commands based on the attacker command frequency count computed for each attacker command of the set of attacker commands, wherein the attacker command frequency count of each infrequent attacker command of the one or more infrequent attacker commands are below a predetermined minimum attacker command frequency threshold value;
encoding at least one behavioral sequence model based on the set of attacker commands and the one or more infrequent attacker commands;
at a cybersecurity event detection and response service:
receiving, via the one or more processors, a request to execute a computer-executable threat hunting protocol that includes the at least one behavioral sequence model and at least one auxiliary enrichment dataset;
executing, via the one or more processors, the computer-executable threat hunting protocol to assess digital activity data associated with one or more environments of the subscriber to the cybersecurity event detection and response service, wherein executing the computer-executable threat hunting protocol includes:
executing the at least one behavioral sequence model to output an initial set of likely suspicious digital activity that occurred within the one or more environments of the subscriber and that satisfies one or more predetermined attacker-indicative conditions of the at least one behavioral sequence model,
assessing the initial set of likely suspicious digital activity outputted by the at least one behavioral sequence model against the at least one auxiliary enrichment dataset to identify a subset of the initial set of likely suspicious digital activity that is not suspicious, and
outputting a refined set of suspicious digital activity by removing the subset that is not suspicious from the initial set of likely suspicious digital activity; and
surfacing, via a graphical user interface, the refined set of suspicious digital activity in response to executing the computer-executable threat hunting protocol.

11. The computer-program product according to claim 10, further comprising:
executing, via the one or more processors, one or more cybersecurity handling actions that resolves or mitigates a cybersecurity threat associated with the refined set of suspicious digital activity.

12. The computer-program product according to claim 11, wherein:
encoding the behavioral sequence model based on the set of attacker commands and the one or more infrequent attacker commands includes encoding the behavioral sequence model to output the initial set of likely suspicious digital activity when at least one of the one or more predetermined attacker-indicative conditions is met,
a first predetermined attacker-indicative condition of the one or more predetermined attacker-indicative conditions is met when a subject sequence of digital activity that occurred within the one or more environments of the subscriber includes a predetermined number of attacker commands that match or correspond to one or more attacker commands of the set of attacker commands within a predetermined timeframe, and
a second predetermined attacker-indicative condition of the one or more predetermined attacker-indicative conditions is met when a given sequence of digital activity that occurred within the one or more environments of the subscriber includes (i) a predefined number of attacker commands that match or correspond to one or more attacker commands of the set of attacker commands within the predetermined timeframe and (ii) one infrequent attacker command that matches or corresponds to the one or more infrequent attacker commands within the predetermined timeframe.

13. The computer-program product according to claim 10, wherein:
the at least one behavioral sequence model includes:
a first behavioral sequence model that is configured to detect suspicious digital activity that corresponds to a first distinct attack type, and
a second behavioral sequence model that is configured to detect suspicious digital activity that corresponds to a second distinct attack type.

14. The computer-program product according to claim 13, wherein:
the at least one auxiliary enrichment dataset includes:
a first distinct auxiliary enrichment dataset that provides contextual data related to error events,
a second distinct auxiliary enrichment dataset that provides contextual data related to infrequently used autonomous system numbers (ASN) and internet protocol (IP) addresses across all subscribers to the cybersecurity event detection and response service, wherein each infrequently used autonomous system number and each infrequently used internet protocol address is below a low-usage count threshold, and
a third distinct auxiliary enrichment dataset that provides contextual data related to the internet protocol (IP) addresses involved in cybersecurity incidents.

15. The computer-program product according to claim 10, wherein:
the at least one behavioral sequence model includes a set of computer-executable instructions that, when executed, executes an automated sequence of tasks that:
automatically queries one or more corpora of historical event data of the subscriber of a predetermined time span based on the predetermined attacker-indicative conditions of the at least one behavioral sequence model, and
automatically returns the initial set of likely suspicious digital activity that occurred within the one or more environments of the subscriber in response to querying the one or more corpora of historical event data.

16. The computer-program product according to claim 10, wherein:
the refined set of suspicious digital activity includes one or more compromised digital assets or one or more compromised computing assets of the subscriber,
the computer-program product further comprises computer instructions for performing operations including:
collecting one or more additional pieces of context data related to each of the one or more compromised digital assets or the one or more compromised computing assets of the subscriber when the refined set of suspicious digital activity includes the one or more compromised digital assets or the one or more compromised computing assets of the subscriber.

17. The computer-program product according to claim 10, wherein:
the refined set of suspicious digital activity includes one or more compromised digital assets or one or more compromised computing assets of the subscriber,
the computer-program product further comprises computer instructions for performing operations including:
generating, via the one or more processors, one or more security alerts based on the one or more compromised digital assets or the one or more compromised computing assets of the subscriber, and
routing, via the one or more processors, each of the one or more security alerts to a security alert queue in response to generating the one or more security alerts.

18. A computer-implemented method for adaptive cybersecurity threat hunting, the method comprising:
sourcing, from a computer database, a corpus of raw event data that includes digital activity that occurred within one or more environments of a target subscriber;
identifying a set of attacker events indicative of a target attack type based on assessing the corpus of raw event data of the target subscriber, wherein the set of attacker events are used in a majority of real-world attacks of the target attack type;
computing, for each attacker event of the set of attacker events, an event frequency count that numerically represents an occurrence of a subject attacker event within historical raw event data of a plurality of subscribers;
identifying one or more infrequent attacker events of the set of attacker events based on the event frequency count computed for each attacker event of the set of attacker events, wherein the event frequency count of each infrequent attacker event of the one or more infrequent attacker events is below a predetermined minimum event frequency threshold value;
encoding a computer-executable threat hunting protocol configured to identify suspicious digital activity of the target attack type in the one or more environments of the target subscriber, wherein encoding the computer-executable threat hunting protocol includes:
constructing an attacker behavioral sequence model based on the set of attacker events and the one or more infrequent attacker events; and
surfacing, via a graphical user interface, suspicious sequences of digital activity that occurred in the one or more environments of the target subscriber in response to executing the computer-executable threat hunting protocol, wherein:
executing the computer-executable threat hunting protocol includes executing, via the one or more processors, the attacker behavioral sequence model,
executing the attacker behavioral sequence model includes assessing a target corpus of raw event data of a target timespan of the target subscriber to identify a plurality of suspicious sequences of digital activity within the target corpus of raw event data that satisfy predefined attacker-indicative conditions of the attacker behavioral sequence model, and
the suspicious sequences of digital activity include the plurality of suspicious sequences of digital activity identified by the attacker behavioral sequence model.

19. A computer-implemented method for adaptive cybersecurity threat hunting, the method comprising:
sourcing, from a computer database, a corpus of raw event data that includes digital activity that occurred within one or more environments of a target subscriber;
identifying a set of attacker event types indicative of a target attack type based on assessing the corpus of raw event data of the target subscriber, wherein the set of attacker event types are used in a majority of real-world attacks of the target attack type;
computing, for each attacker event type of the set of attacker event types, an event frequency count that numerically represents an occurrence of a subject attacker event type within historical raw event data of a plurality of subscribers;

identifying one or more infrequent attacker event types of the set of attacker event types based on the event frequency count computed for each attacker event type of the set of attacker event types, wherein the event frequency count of each infrequent attacker event type of the one or more infrequent attacker event types is below a predetermined minimum event frequency threshold value;

encoding a computer-executable threat hunting protocol configured to identify suspicious digital activity of the target attack type in the one or more environments of the target subscriber, wherein encoding the computer-executable threat hunting protocol includes:

constructing an attacker behavioral sequence model based on the set of attacker event types and the one or more infrequent attacker event types, wherein:

constructing the attacker behavioral sequence model includes encoding the attacker behavioral sequence model to output the suspicious sequences of digital activity when any one of a plurality of predefined attacker-indicative conditions is satisfied, and the plurality of predefined attacker-indicative conditions is configured to value the one or more infrequent attacker event types with greater significance than any attacker event type of the set of attacker event types that are not classified or identified as infrequent attacker event types; and surfacing, via a graphical user interface, suspicious sequences of digital activity that occurred in the one or more environments of the target subscriber in response to executing the computer-executable threat hunting protocol.

* * * * *